US012075104B2

United States Patent
Bampis et al.

(10) Patent No.: US 12,075,104 B2
(45) Date of Patent: Aug. 27, 2024

(54) QUANTIFYING PERCEPTUAL QUALITY MODEL UNCERTAINTY VIA BOOTSTRAPPING

(71) Applicant: NETFLIX, INC., Los Gatos, CA (US)

(72) Inventors: Christos Bampis, Los Gatos, CA (US); Zhi Li, Mountain View, CA (US); Lavanya Sharan, Menlo Park, CA (US); Julie Novak, San Jose, CA (US); Martin Tingley, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/352,755

(22) Filed: Mar. 13, 2019

(65) Prior Publication Data

US 2019/0297329 A1 Sep. 26, 2019

Related U.S. Application Data

(60) Provisional application No. 62/767,454, filed on Nov. 14, 2018, provisional application No. 62/645,774, filed on Mar. 20, 2018.

(51) Int. Cl.
*G06T 7/00* (2017.01)
*G06F 18/214* (2023.01)
(Continued)

(52) U.S. Cl.
CPC ......... *H04N 21/252* (2013.01); *G06F 18/214* (2023.01); *G06N 20/20* (2019.01);
(Continued)

(58) Field of Classification Search
None
See application file for complete search history.

(56) References Cited

U.S. PATENT DOCUMENTS 10,429,488 B1 * 10/2019 Parks ........................ G01S 3/46
2005/0080613 A1 * 4/2005 Colledge ............... G06F 16/951
704/9
(Continued)

FOREIGN PATENT DOCUMENTS

CN 103299324 A 9/2013
CN 106416251 A 2/2017
(Continued)

OTHER PUBLICATIONS

Minitab (NPL "Understanding Hypothesis Tests: Confidence Intervals and Confidence Levels," available at https://blog.minitab.com/blog/adventures-in-statistics-2/understanding-hypothesis-tests-confidence-intervals-and-confidence-levels 2015 (Year: 2015).*
(Continued)

*Primary Examiner* — Shadan E Haghani
(74) *Attorney, Agent, or Firm* — Artegis Law Group, LLP

(57) ABSTRACT

In various embodiments, a bootstrapping training subsystem performs sampling operation(s) on a training database that includes subjective scores to generate resampled dataset. For each resampled dataset, the bootstrapping training subsystem performs machine learning operation(s) to generate a different bootstrap perceptual quality model. The bootstrapping training subsystem then uses the bootstrap perceptual quality models to quantify the accuracy of a perceptual quality score generated by a baseline perceptual quality model for a portion of encoded video content. Advantageously, relative to prior art solutions in which the accuracy of a perceptual quality score is unknown, the bootstrap perceptual quality models enable developers and software applications to draw more valid conclusions and/or more reliably optimize encoding operations based on the perceptual quality score.

9 Claims, 10 Drawing Sheets

(51) Int. Cl.
 G06N 20/20 (2019.01)
 G06V 10/774 (2022.01)
 H04N 19/154 (2014.01)
 H04N 21/25 (2011.01)
 H04N 17/00 (2006.01)
 H04N 19/147 (2014.01)
(52) U.S. Cl.
 CPC .......... *G06T 7/0002* (2013.01); *G06V 10/774* (2022.01); *H04N 19/154* (2014.11); *G06T 2207/10016* (2013.01); *G06T 2207/20081* (2013.01); *G06T 2207/30168* (2013.01); *H04N 17/004* (2013.01); *H04N 19/147* (2014.11)

(56) References Cited

U.S. PATENT DOCUMENTS

| | | |
|---|---|---|
| 2008/0133275 A1 | 6/2008 | Haug et al. |
| 2013/0229310 A1 | 9/2013 | Parks et al. |
| 2014/0282775 A1 | 9/2014 | Bhat et al. |
| 2016/0021376 A1* | 1/2016 | Andreopoulos ..... H04N 17/004 348/181 |
| 2016/0335754 A1 | 11/2016 | Aaron et al. |
| 2018/0020243 A1 | 1/2018 | Ni et al. |
| 2018/0240017 A1* | 8/2018 | Huszar ................ G06N 3/0454 |
| 2019/0297329 A1 | 9/2019 | Bampis et al. |

FOREIGN PATENT DOCUMENTS

| | | |
|---|---|---|
| KR | 10-2005-0084940 A | 8/2005 |
| WO | 2016/197026 A1 | 12/2016 |

OTHER PUBLICATIONS

Brieman "Bagging Predictors," Machine Learning (1996) (Year: 1996).*
International Search Report for application No. PCT/US2019/023256 dated Jun. 3, 2019.
Mushtaq et al., "Empirical Study Based on Machine Learning Approach to Assess the QoS/QoE Correlation", Networks and Optical Communications (NOC), 2012 17th European Conference on, IEEE, Jun. 20, 2017, 7 pages.
Cosman et al., "Evaluating Quality of Compressed Medical Images: SNR, Subjective Rating, And Diagnostic Accuracy", Proceedings of the IEEE, IEEE. New York, US, vol. 82, No. 6, Jun. 1, 1994, pp. 919-932,.
Engelke et al., "Human Observer Confidence in Image Quality Assessment", Signal Processing: Image Communication, vol. 27, No. 9, Oct. 1, 2012, pp. 935-947.
Wager et al., "Confidence Intervals for Random Forests: The Jackknife and the Infinitesimal Jackknife", Journal of Machine Learning Research, vol. 15, No. 1, Jan. 1, 2014, pp. 1625-1651.
Non-Final Office Action received for U.S. Appl. No. 16/352,757, dated Mar. 27, 2020, 22 pages.
Netflix (NPL, "Toward a Practical Perceptual Video Quality Metric," Netflix Tech Blog, Jun. 2016, available at https://netflixtechblog.com/toward-a-practical-perceptual-video-quality-metric-653f208b9652) (Year: 2016).
Bjontegaard (NPL "Calculation of average PSNR differences between RD-curves," VCEG-M33, 2001) (Year: 2001).
Kirkman (NPL "Kolmogorov-Smirnov Test," http://www.physics.csbsju.edu/stats/2007) (Year: 2007).
Non-Final Office Action received for U.S. Appl. No. 16/352,757, dated Apr. 23, 2021 25 pages.
Breimann, Bagging Predictors, Machine Learning, 24, 123-140 (1996) (Year: 1996).
Final Office Action received for U.S. Appl. No. 16/352,757, dated Jul. 22, 2020, 43 pages.
Final Office Action received for U.S. Appl. No. 16/352,757, dated Aug. 24, 2021, 48 pages.
Notice of Allowance received for U.S. Appl. No. 16/352,757, dated Feb. 7, 2022, 45 pages.
Hao et al., "Research on key technologies of large-scale streaming media", Chinese Journal of Computers, vol. 31, No. 5, May 31, 2008, pp. 755-774.

* cited by examiner

QUANTIFYING PERCEPTUAL QUALITY MODEL UNCERTAINTY VIA BOOTSTRAPPING

CROSS-REFERENCE TO RELATED APPLICATIONS

This application claims the priority benefit of the U.S. Provisional Patent Application having Ser. No. 62/645,774 and filed on Mar. 20, 2018, and the U.S. Provisional Patent Application having Ser. No. 62/767,454 and filed on Nov. 14, 2018. The subject matter of these related applications is hereby incorporated herein by reference.

BACKGROUND OF THE INVENTION

Field of the Invention

Embodiments of the present invention relate generally to computer science and video technology and, more specifically, to techniques for quantifying perceptual quality model uncertainty via bootstrapping.

Description of the Related Art

Efficiently and accurately encoding source videos is an important aspect of real-time delivery of high-quality source videos. Because of variations in the quality of encoded source videos, quality controls are usually implemented to ensure that the visual quality, as perceived by a viewer, of reconstructed source videos that are derived from the encoded source videos is acceptable. Manually verifying the visual quality of reconstructed source videos is prohibitively time consuming. Accordingly, automatically predicting encoded video quality is usually an integral part of an encoding and streaming infrastructure. For example, automated encoded video quality prediction is typically employed when evaluating coder/decoders (codecs) and fine-tuning streaming bitrates to optimize the quality of encoded videos.

One approach to automatically predicting encoded video quality involves performing machine learning operations to generate a perceptual quality model based on raw opinion scores associated with a set of encoded training videos. The raw opinion scores are generated by a set of human subjects based on the perceived visual quality of a set of reconstructed training videos that are decoded from the set of encoded training videos while viewing the reconstructed training videos. After training, the perceptual quality model is used to predict the perceptual quality scores for various encoded source videos. In this fashion, the raw opinion scores enable better predictions of perceptual quality scores for the encoded source videos.

One drawback of using a perceptual quality model is that the accuracy of the perceptual quality scores predicted by the perceptual quality model is unknown. More precisely, the set of encoded training videos used to train the perceptual quality model is only a small sample of all encoded videos. Similarly, the set of human subjects providing the raw opinion scores is only a small sample of all viewers. As a general matter, a sample typically does not have the same average composition as the associated population, and the variation in the composition of a given sample is a source of statistical uncertainty. Consequently, both the set of encoded training videos and the set of human subjects are sources of statistical uncertainty that can reduce the overall accuracy of the perceptual quality scores predicted by the perceptual quality model.

Because the accuracy of each perceptual quality score is unknown, drawing valid conclusions and optimizing encoding operations based on the perceptual quality scores generated by the perceptual quality model could cause problems. For example, some codec comparison applications compute a Bjontegaard delta rate ("BD-rate") value based on perceptual quality scores to evaluate the performance of a test codec relative to the performance of a reference codec. The BD-rate value specifies a percentage bitrate change when encoding using the test codec relative to encoding using the reference codec while maintaining the same perceptual quality score. However, because the accuracy of each perceptual quality score is unknown, the accuracy of the BD-rate value also is unknown. Consequently, drawing a valid conclusion regarding whether the test codec performs better than the reference codec based on the BD-rate value is not possible.

As the foregoing illustrates, what is needed in the art are techniques for quantifying the accuracy of perceptual quality scores.

SUMMARY OF THE INVENTION

One embodiment of the present invention sets forth a computer-implemented method for quantifying the accuracy of a perceptual quality score. The method includes performing one or more sampling operations on a training database that includes subjective scores to generate a resampled datasets; for each resampled dataset, performing one or more machine learning operations based on the resampled dataset to generate a different bootstrap perceptual quality model; and performing one or more operations based on the bootstrap perceptual models to quantify the accuracy of a perceptual quality score generated by a baseline perceptual quality model for a portion of encoded video content.

One technical advantage of the disclosed techniques relative to prior art solutions is that a distribution of bootstrap perceptual quality scores is associated with each baseline perceptual quality score. The distribution of bootstrap perceptual quality scores indicates the accuracy of the baseline perceptual quality score. Unlike prior art solutions in which the accuracy of a perceptual quality score is unknown, the distribution of bootstrap perceptual quality scores enables developers and software applications to draw more valid conclusions and/or more reliably optimize encoding operations based on the baseline perceptual quality score. In particular, computing different bootstrap Bjontegaard delta rate (BD-rate) values based on bootstrap perceptual quality scores enables developers and software applications to determine whether a baseline BD-rate value computed based on baseline perceptual quality scores is statistically significant, which enables test codecs to be more reliably tested against reference codes. These technical advantages provide one or more technological advancements over the prior art.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
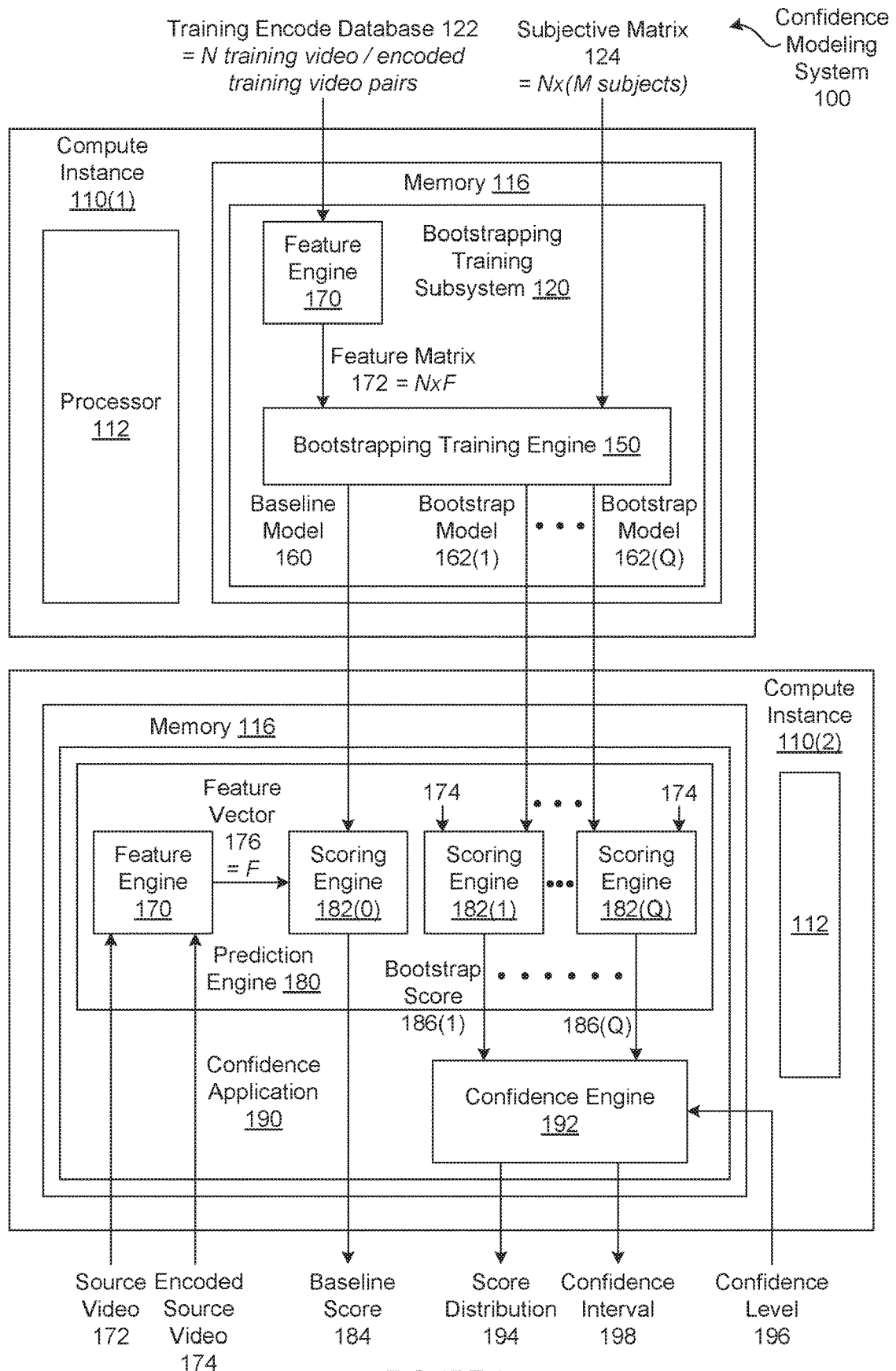
FIG. 1 is a conceptual illustration of a confidence modeling system configured to implement one or more aspects of the present invention.

In the following description, numerous specific details are set forth to provide a more thorough understanding of the present invention. However, it will be apparent to one of skilled in the art that the present invention may be practiced without one or more of these specific details.

To optimize the overall visual experience that a media service provides to viewers, the media service provider oftentimes implements automated encoded video quality prediction as part of an encoding and streaming infrastructure. For example, the media service provider could employ automated encoded video quality prediction to evaluate coder/decoders (codecs) and/or fine-tune streaming bitrates to optimize the quality of encoded videos. In a typical prior art technique for assessing the quality of encoded videos, a training application performs machine learning operations to generate a perceptual quality model based on raw opinion scores associated with a set of encoded training videos. The raw opinion scores are generated by a set of human subjects based on the perceived visual quality of a set of reconstructed training videos that are decoded from the set of encoded training videos while viewing the reconstructed training videos. After training, the perceptual quality model is used to predict the perceptual quality scores for various encoded source videos.

One drawback of using a perceptual quality model is that the accuracy of the perceptual quality scores predicted by the perceptual quality model is unknown. More precisely, the set of encoded training videos used to train the perceptual quality model typically does not have the same average composition as all encoded videos. Similarly, the set of human subjects providing the raw opinion scores does not have the same average composition as all viewers. As a result, both the set of human subjects and the set of encoded training videos are sources of statistical uncertainty that can reduce the overall accuracy of the perceptual quality scores predicted by the perceptual quality model.

For example, suppose that an "idealized" perceptual quality model could be trained based on raw opinion scores from all viewers for all encoded videos. Neither the human subjects nor the encoded videos would be a source of statistical uncertainty. Consequently, the perceptual quality score computed by the idealized perceptual quality model for any encoded source video would accurately reflect an average perceived visual quality for a reconstructed source video derived from the encoded source video. By contrast, suppose that a typical perceptual quality model was trained based on raw opinion scores from ten people for two encoded training videos (twenty total raw opinion scores). Both the ten people and the two encoded training videos would be associated with a high statistical uncertainty. Consequently, the likelihood that the perceptual quality score computed by the typical perceptual quality model for an encoded source video would accurately reflect an average perceived visual quality for a reconstructed source video derived from the encoded source video would be relatively low.

Because the accuracy of each perceptual quality score is unknown, drawing valid conclusions and optimizing encoding operations based on the perceptual quality scores generated by the perceptual quality model could cause problems. For example, some codec comparison applications compute a Bjontegaard delta rate (BD-rate) value based on perceptual quality scores to evaluate the performance of a test codec relative to a reference codec. The BD-rate value specifies a percentage bitrate change when encoding using the test codec relative to encoding using the reference codec while maintaining the same perceptual quality score. However, because the accuracy of each perceptual quality score is unknown, the accuracy of the BD-rate value also is unknown. Consequently, drawing a valid conclusion regarding whether the test codec performs better than the reference codec based on the BD-rate value is not possible.

For example, a BD-rate value of −4% would indicate that encoding using the test codec results in an average 4% bitrate savings compared to encoding using the reference codec. However, because of the uncertainty associated with the perceptual quality scores, encoding using the test codec could actually result in an average −2% bitrate savings compared to encoding using the reference codec. In general, the −4% bitrate saving may not be statistically significant. Therefore, if the media service provider were to make changes to the encoding and streaming infrastructure and the changes did not lead to actual improvements, then the required engineering effort would be wasted.

With the disclosed techniques, however, a confidence modeling system can automatically quantify the accuracy of perceptual quality scores and, optionally, the accuracy of BD-rate values. In a training phase, a bootstrapping training engine performs machine learning operations based on a set of N encoded training videos and raw opinion scores associated with a set of M human subjects to generate a baseline perceptual quality model. The bootstrapping training engine then performs bootstrapping based on the set of encoded training videos and/or the raw opinion scores. In general, bootstrapping involves performing resampling with replacement operations on a sample of items from a general population of items to estimate statistics, such as uncertainty, associated with the sample of items.

In some embodiments, the bootstrapping training engine performs resampling with replacement operations to estimate a coupled statistical uncertainty associated with sampling the set of N encoded training videos from all encoded videos and sampling the set of M human subjects from all humans. First, the bootstrapping training engine performs resampling with replacement operations on the set of encoded training videos and the set of human subjects to generate, respectively, resampled encoded video sets and resampled subject sets. For example, suppose that the set of encoded training videos was ("A," "B") and the set of human subjects was ("Tom," "Jerry," "Anna"). The bootstrapping training engine could generate two resampled encoded videos sets ("B", "B") and ("A," "A"), and two resampled subject sets ("Tom," "Jerry," Jerry") and ("Tom," Tom," "Tom"). The bootstrapping training engine could then generate combinations of the resampled encoded video sets and the resampled subject sets to generate four resampled datasets. A first resampled dataset could be based on ("B," "B") and ("Tom," Tom," "Tom"), a second resampled dataset could be based on ("B", "B") and ("Tom," "Jerry," Jerry"), a third resampled dataset could be based on ("A," "A"), and ("Tom," Tom," "Tom"), and a fourth resampled dataset could be based on ("A," "A") and ("Tom," "Jerry," Jerry").

Subsequently, for each resampled dataset, the bootstrapping training engine performs machine learning operations based on the resampled dataset to generate a different bootstrap perceptual quality model. Accordingly, if the bootstrapping training engine generates 1,000 different resampled datasets, then the bootstrapping training engine generates 1,001 different perceptual quality models—1 baseline perceptual quality model and 1000 bootstrap perceptual quality models.

In an evaluation phase, for a source encoded video, a confidence application computes a baseline perceptual quality score based on the baseline perceptual quality model. For each bootstrap perceptual quality model, the confidence engine computes a different bootstrap perceptual quality score based on the bootstrap perceptual quality model. Together, the bootstrap perceptual quality scores form a distribution of bootstrap perceptual quality scores that reflects the uncertainty associated with the baseline perceptual quality score. The confidence application then generates a confidence interval based on the distribution of bootstrap perceptual quality scores. The confidence interval quantifies the accuracy of the baseline perceptual quality score.

At least one technical advantage of the disclosed techniques relative to prior art solutions is that quantifying the accuracy of a baseline perceptual quality score enables developers and software applications to generate more valid data and/or more valid conclusions based on the baseline perceptual quality score. For example, a software application that dynamically optimizes encoding operations may determine whether a difference in perceptual quality scores is significant based on the associated confidence intervals. In another example, suppose that the confidence intervals associated with the perceptual quality scores for relatively low resolution encoded source videos are significantly larger than the confidence intervals associated with the perceptual quality scores for relatively high resolution encoded sources videos. The video service provider could add additional low resolution encoded sources to the training encode database. Subsequently, the bootstrapping training engine could retrain the baseline perceptual quality model and the bootstrap perceptual quality model to improve the accuracy of the baseline perceptual quality scores for low resolution encoded source videos. These technical advantages provide one or more technological advancements over the prior art.

In some embodiments, a BD-rate comparison application computes a baseline BD-rate value for a test codec using the baseline perceptual quality model. For each bootstrap model, the BD-rate comparison application computes a different baseline BD-rate value for the test codec using the perceptual quality bootstrap model. Together, the bootstrap BD-rate values for the test codec form a distribution of bootstrap BD-rate values that reflects the uncertainty associated with the baseline BD-rate value. The confidence application then generates a BD-rate confidence interval associated with the baseline BD-rate value based on the distribution of bootstrap BD-rate values. The BD-rate confidence interval quantifies the accuracy of the baseline BD-rate value.

At least one technical advantage of the disclosed techniques relative to prior art solutions is that each of the BD-rate distribution and the BD-rate confidence interval associated with the test codec enables developers and software applications to generate more valid results (e.g., data, conclusions, etc) when evaluating the test codec. For example, to determine whether a bitrate performance difference between the test codec and a reference codec is statistically significant, a software application could compute the BD_rate confidence interval for the test codec and a confidence level of 95%. If the BD-rate value of zero is within the BD-rate confidence interval, then the software application could conclude that the bitrate performance difference between the test codec and the reference codec is statistically insignificant. As a result, the software application could forgo re-encoding source videos based on the test codec, saving both time and computing resources. These technical advantages provide one or more technological advancements over the prior art.

Confidence Modeling System Overview

FIG. 1 is a conceptual illustration of a confidence modeling system 100 configured to implement one or more aspects of the present invention. As shown, the confidence modeling system 100 includes, without limitation, any number and type of compute instances 110. For explanatory purposes, multiple instances of like objects are denoted with reference numbers identifying the object and parenthetical numbers identifying the instance where needed. In various embodiments, any number of the compute instances 110 may be distributed across multiple geographic locations or implemented in one or more cloud computing environments (i.e., encapsulated shared resources, software, data, etc.) in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110. In alternate embodiments, each of the compute instances 110 may include, without limitation, any number of processors 112 and any number of memories 116 in any combination. In particular, any number of compute instances 110 (including one) may provide a multiprocessing environment in any technically feasible fashion.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

Each of the compute instances 110 is configured to implement one or more applications (also referred to herein as "software applications") or subsystems of applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110(1) is configured to perform machine learning operations to generate a perceptual quality model. In a complementary fashion, the compute instance 110(2) is configured to generate perceptual quality scores for encoded video content based on the perceptual quality model. Each perceptual quality score correlates in a universal manner to subjective human visual experience when viewing reconstructed video content derived from the source video content. One example of a perceptual quality model is a Video Multimethod Assessment Fusion ("VMAF") model that generates values for a VMAF metric (i.e., perceptual quality scores).

As described previously herein, in conventional approaches to generating a perceptual quality model, the perceptual quality model is trained based on a set of encoded training videos and raw opinion scores associated with both the set of encoded training videos and a set of human subjects. Subsequently, the perceptual quality model is used to predict values for perceptual quality scores for source encoded videos. One drawback of conventional approaches to generating the perceptual quality model is that both the set of encoded training videos and the set of human subjects are sources of statistical uncertainty. Because the perceptual quality model is trained based on data that is associated with unknown statistical uncertainty, the resulting perceptual quality model is also associated with unknown statistical uncertainty. As a result, the accuracy of each perceptual quality score predicted by the perceptual quality model is unknown.

Quantifying the Accuracy of Perceptual Quality Scores

To quantify the accuracy of perceptual quality scores predicted by a perceptual quality model, the confidence modeling system 100 includes, without limitation, a bootstrapping training subsystem 120 and a confidence application 190. The bootstrapping training subsystem 120 resides in the memory 116(1) and executes on the processor 112(1) of the compute instance 110(1) during a training phase. The confidence application 190 resides in the memory 116(2) and executes on the processor 112(2) of the compute instance 110(2) during an evaluation phase that follows the training phase.

For explanatory purposes, the confidence modeling system 100 is described in the context of videos. However, as persons skilled in the art will recognize, the disclosed techniques may be applied to any number and type of portions of video content without departing from the scope and spirit of the described embodiments and techniques. For example, the disclosed techniques may be applied to, without limitation, feature-length movies, episodes of television shows, individual images, audiovisual clips, and so forth.

During the training phase, the bootstrapping training subsystem 120 generates a baseline model 160 and bootstrap models 162(1)-162(Q) based on a training encode database 122 and a subjective matrix 124. The combination of the training encode database 122 and the subjective matrix 124 is also referred to herein as "a training database." The training encode database 122 includes, without limitation, N training video/encoded training pairs. For explanatory purposes only, a training video/encoded training pair is also referred to herein as a "training pair." Each training pair includes, without limitation, a training video and an encoded training video that is an encoded version of the training video.

The subjective matrix 124 is an N×M matrix of raw opinion scores, where N is the number of training pairs included in the training encode database 122 and M is a number of human subjects. Although not shown, to generate the subjective matrix 124, for each of the N training pairs, a decoder decodes the encoded training video to generate reconstructed training video. The M human subjects watch the reconstructed training videos on display devices, such as the screen of a laptop or a television, and personally rate the visual quality—assigning raw opinion scores to the reconstructed training videos. The human subjects may assess the visual quality of the reconstructed training videos and assign the raw opinion scores in any technically feasible fashion and based on any type of rating system.

The bootstrapping training subsystem 120 includes, without limitation, a feature engine 170 and a bootstrapping training engine 150. The feature engine 170 generates a feature matrix 172 based on the training encode database 122. The size of the feature matrix 172 is N×F, where N is the number of training pairs included in the training encode database 122 and F is a number of features. Each row of the feature matrix 172 is associated with a different training pair and includes, without limitation, a different feature value for each of the F features. Each column of the feature matrix 172 is associated with a different feature and includes, without limitation, a different feature value for each training pair.

Each feature represents a characteristic of encoded video content and/or associated video content and is associated with one or more objective metrics. The feature engine 170 may compute any number of objective values for any number of objective metrics and any number of features based on the objective values in any technically feasible fashion. For instance, in some embodiments, the feature engine 170 computes feature values for, without limitation, one additive impairment measure ("ADM") feature, four visual information fidelity ("VIF") features, twelve blind/referenceless image spatial quality evaluator ("BRISQUE") features, and a temporal information ("TI") feature.

As shown, the bootstrapping training engine 150 generates the baseline model 160 and the bootstrap models 162 based on the feature matrix 172 and the subjective matrix 124. Each of the baseline model 160 and the bootstrap models 162 is a different perceptual quality model. To generate the baseline model 160, a subject aggregator (not shown in FIG. 1) performs any number and type of aggregation operations on the raw opinion scores included in the subjective matrix 124 to compute a subjective vector having a size of N×1. The subjective vector includes, without limitation, a different aggregate subjective score (e.g., a mean opinion score (MOS)) for each of the encoded training videos.

Subsequently, a perceptual model trainer (not shown in FIG. 1) implements any number and type of machine learning algorithms that recognize patterns between the feature matrix 172 and the subjective vector. More precisely, the perceptual model trainer fuses feature values included in the feature matrix 172 into aggregate subjective scores that reflect the experience of the M human subjects. After the perceptual model trainer finishes executing the machine learning algorithms, the perceptual model trainer generates the baseline model 160 that computes perceptual quality scores for encoded video content based on feature values for the encoded video content.

The feature matrix 172 is associated with an N item sample of a population of all encoded videos. Similarly, the subjective matrix is associated with an M item sample of a population of all humans. As a general matter, a sample does not have the same average composition as the associated population and the potential variation in the composition of the sample is a source of statistical uncertainty. Consequently, both the feature matrix 172 and the subjective matrix 124 are sources of statistical uncertainty that can reduce the accuracy of the perceptual quality scores predicted by the baseline model 160.

To estimate the statistical uncertainties associated with the feature matrix 172 and/or the subjective matrix 174, the bootstrapping training engine 150 performs bootstrapping operations to generate Q resampled datasets (not shown in FIG. 1). As persons skilled in the art will recognize, bootstrapping involves performing resampling with replacement operations on a sample of items from a general population of items to estimate statistics, such as uncertainty, associated with the sample of items.

In some embodiments, the bootstrapping training engine 150 performs "encode bootstrapping." In encode bootstrapping, the bootstrapping training engine 150 performs resampling with replacement operations on the feature matrix 172 based on the N training pairs to generate Q resampled feature matrices (not shown in FIG. 1). For each resampled feature matrix, the bootstrapping training engine generates a different resampled dataset based on the resampled feature matrix and the subjective vector. Encode bootstrapping is described in greater detail in conjunction with FIG. 2.

In other embodiments, the bootstrapping training engine 150 performs "subjective bootstrapping." In subjective bootstrapping, the bootstrapping training engine 150 performs resampling with replacement operations on the subjective matrix 172 based on the M human subjects. For each resampled subjective matrix, the subject aggregator generates a corresponding resampled subjective vector. Subsequently, for each resampled subjective vector, the bootstrapping training engine 150 generates a different resampled dataset based on the feature matrix 172 and the resampled subjective vector. Subjective bootstrapping is described in greater detail in conjunction with FIG. 3.

In yet other embodiments, the bootstrapping training engine 150 performs "coupled bootstrapping." In coupled bootstrapping, the bootstrapping training engine 150 performs resampling with replacement operations on the feature matrix 172 based on the N training pairs in addition to resampling with replacement operations on the subjective matrix 172 based on the M human subjects. For each resampled subjective matrix, the subject aggregator generates a corresponding resampled subjective vector. Subsequently, for each combination of resampled feature matrix and resampled subjective vector, the bootstrapping training engine 150 generates a different resampled dataset based on the resampled feature matrix and the resampled subjective vector. Coupled bootstrapping is described in greater detail in conjunction with FIG. 4.

Each resampled dataset includes, without limitation, an N×F matrix of feature values and an N×1 vector of aggregate subjective scores. For each of the Q resampled datasets, a different instance of the perceptual model trainer generates a different bootstrap model 162 based on the feature values and the aggregate subjective scores included in the resampled dataset. Each of the resulting bootstrap models 162(1)-162(Q) computes a different perceptual quality score for encoded video content based on the feature values for the encoded video content. In alternate embodiments, any number of instances of the perceptual model trainer may execute in parallel, sequentially, or any combination thereof to generate the bootstrap models 162. However, each bootstrap model 162 is trained independently of the other bootstrap models 162 and the baseline model 160.

During the subsequent evaluation phase, the confidence application 190 generates a baseline score 184, a score distribution 194, and a confidence interval 198 based on the baseline model 160, the bootstrap models 162, a source video 172, an encoded source video 174, and a confidence level 196. As shown, the confidence application 190 includes, without limitation, a prediction engine 180 and a confidence engine 192.

The prediction engine 180 includes without limitation, the feature engine 170 and a scoring engine 182. The feature engine 170 generates a feature vector 176 based on the source video 172 and the encoded source video 174. The feature vector 176 includes, without limitation, F feature values. In general, the scoring engine 182 generates a perceptual quality score based on the feature vector 176 and a perceptual quality model. For explanatory purposes only, Q instances of the scoring engine 182(0)-182(Q-1) are depicted in FIG. 1.

As shown, the scoring engine 182(1) generates the baseline score 184 based on the feature vector 176 and the baseline model 160. More precisely, the scoring engine 182(1) provides the feature vector 176 as an input to the baseline model 160 and, in response, the baseline model 160 computes the baseline score 184. Accordingly, the baseline score 184 is a perceptual quality score that reflects the perceptual visual quality of the encoded source video 174. Notably, the baseline sore 184 reflects influences from the feature values associated with N different training pairs and the raw opinion scores from M different human subjects.

For each of the bootstrap models 162(x), the scoring engine 182(x) generates a bootstrap score 186(x) based on the feature vector 176 and the bootstrap model 162(x). More precisely, the scoring engine 182(x) provides the feature vector 176 as an input to the bootstrap model 162(x) and, in response, the bootstrap model 162(x) computes the bootstrap score 186(x). Accordingly, each of the bootstrap scores 186 is a perceptual quality score that reflects the perceptual visual quality of the encoded source video 174. As persons skilled in the art will recognize, because each of the bootstrap models 162 is associated with a different resampled dataset generated using resampling with replacement, each of bootstrap scores 186 reflects influences from fewer feature values and/or fewer raw opinion scores than the baseline score 184.

For embodiments that implement encode bootstrapping, each of the bootstrap scores 186 reflects influences from less than N different training pairs and the raw opinion scores from M different human subjects. For embodiments that implement subject bootstrapping, each of the bootstrap scores 186 reflects influences from the feature values associated with N different training pairs and the raw opinion scores from less than M different human subjects. For embodiments that implement coupled bootstrapping, each of the bootstrap scores 186 reflects influences from the feature values associated with less than N different training pairs and the raw opinion scores from less than M different human subjects.

Upon receiving the bootstrap scores 186(1)-186(Q), the confidence engine 192 generates the score distribution 194 that includes, without limitation, the bootstrap scores 186(1)-186(Q). Advantageously, as persons skilled in the art will recognize, the score distribution 194 quantifies the accuracy of the baseline score 184. Further, the confidence engine 192 computes the confidence interval 198 based on the score distribution 194 and the confidence level 196. The confidence engine 196 may compute the confidence interval 198 in any technically feasible fashion. For example, to compute the confidence interval 198 for the confidence level of 95%, the confidence engine 196 could determine the interval that excludes the lowest 2.5% of the bootstrap scores 186 and the highest 2.5% of the bootstrap scores 186. Advantageously, the confidence interval 198 quantifies the accuracy of the baseline score 184.

Subsequently, the confidence engine 162 transmits the baseline score 184, the score distribution 194, and/or the confidence interval 198 to any number of software applications. Advantageous, each of the score distribution 194 and the confidence interval 198 enables developers and software applications to draw valid conclusions and reliably optimize encoding operations based on the baseline score 184.

In alternate embodiments, the confidence engine 162 may perform any type of statistical analysis based on the score distribution 194 to generate any number and type of accuracy, variability, uncertainty, and/or confidence metrics associated with the perceptual quality of the encoded source video 174 in any technically feasible fashion. Further, the confidence engine 162 may transmit any amount and type of data associated with the baseline score 182 and/or the bootstrap scores 186 to any number of software applications.

Although not shown, the confidence application 190 and/or different instances of the confidence application 190 may execute sequentially, concurrently, or any combination thereof to generate the baseline scores 184, associated score distributions 194, and the confidence intervals 198 for any number of different portions of video content.

Note that the techniques described herein are illustrative rather than restrictive, and may be altered without departing from the broader spirit and scope of the invention. In particular, the bootstrapping training subsystem 120, the feature engine 170, the bootstrapping training engine 150, the scoring engine 182, and the confidence engine 192 may be implemented in any number of software applications in any combination. Further, in various embodiments, any number of the techniques disclosed herein may be implemented while other techniques may be omitted in any technically feasible fashion.

Many modifications and variations on the functionality provided by bootstrapping training subsystem 120, the feature engine 170, the bootstrapping training engine 150, the scoring engine 182, and the confidence engine 192 will be apparent to those of ordinary skill in the art without departing from the scope and spirit of the described embodiments. Alternate embodiments include performing any type of bootstrapping operations when training a perceptual quality model to generate additional perceptual quality models that provide insight into the accuracy of perceptual quality scores.

For instance, in some embodiments, the bootstrapping training engine 150 performs bootstrapping operations based on residuals instead of the feature matrix 172 and/or the subjective matrix 124. More precisely, after generating the baseline model 160, the bootstrapping training engine 150 computes the baseline score 184 for each of the encoded training videos. For each encoded training video, the bootstrapping training engine 150 subtracts the baseline score 184 from the aggregated subjective score to generate a different residual included in a residual vector. The bootstrapping training engine 150 performs resampling with replacement operations on the residue vector to generate Q resampled residual vectors. For each resampled residual vector, the bootstrapping training engine 150 modifies the subjective vector based on the resampled residual vector and performs training operations based on the feature matrix 172 and the modified subjective vector to generate a corresponding bootstrap model 162.

Generating Perceptual Quality Models

Figure 2:
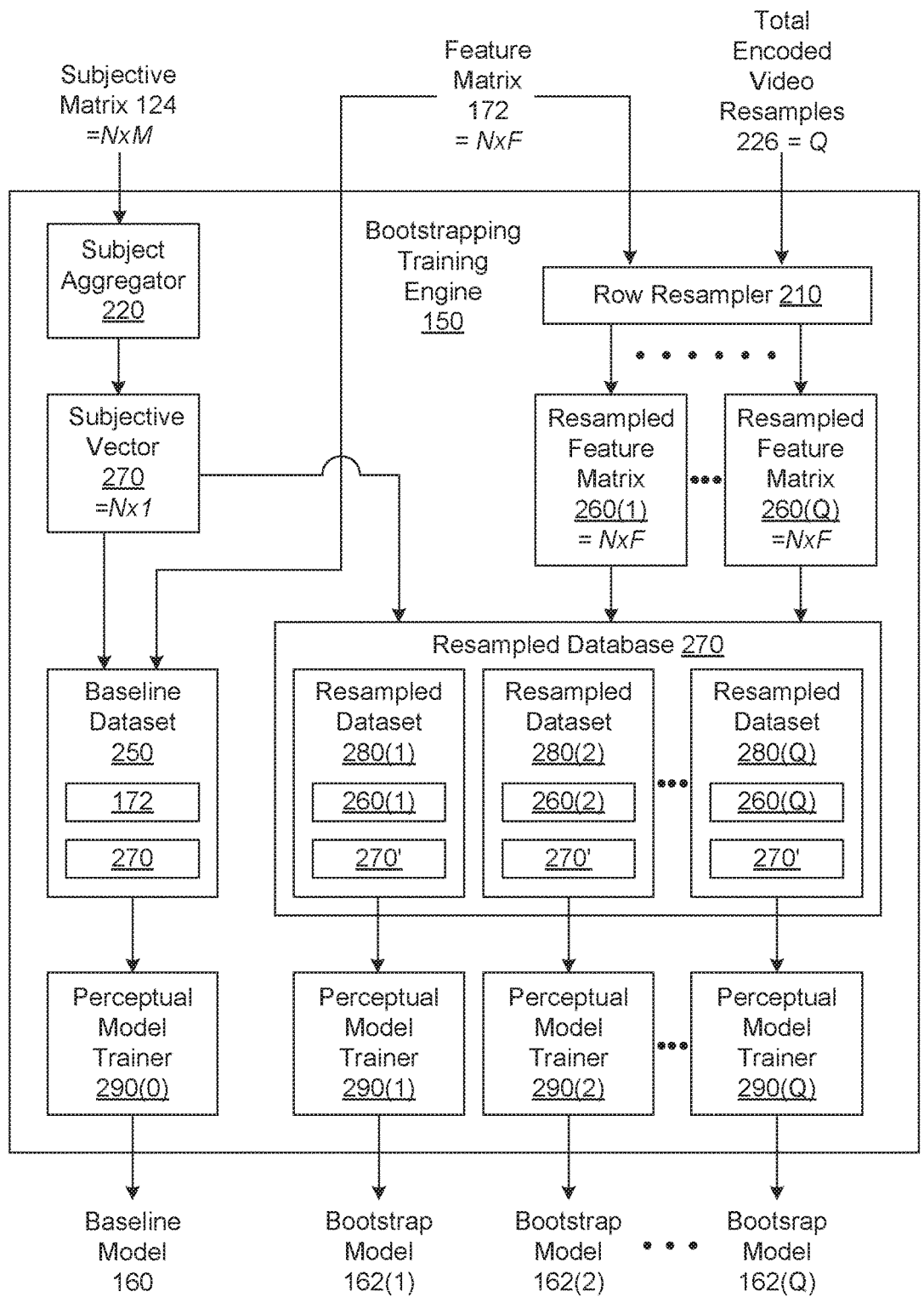
FIG. 2 is a more detailed illustration of the bootstrapping training engine of FIG. 1, according to various embodiments of the present invention.

FIG. 2 is a more detailed illustration of the bootstrapping training engine 150 of FIG. 1, according to various embodiments of the present invention. The bootstrapping training engine 150 depicted in FIG. 2 is configured to perform encode bootstrapping. As shown, the bootstrapping training engine 150 generates the baseline model 160 and the bootstrap models 162(1)-162(Q) based on the feature matrix 172, the subjective matrix 174, and a total encoded video resamples 226. The total encoded video resamples 226 specifies the total number of resampled feature matrices 260 that the bootstrapped training engine 150 generates. The total number of bootstrap models 162 that the bootstrapped training engine 150 generates is equal to the total number of resampled feature matrices 260.

As shown, the bootstrapping training engine 150 includes, without limitation, the subject aggregator 220, a subjective vector 270, a baseline dataset 250, a row resampler 210, the resampled feature matrices 260(1)-260(Q), a resampled database 270, and a perceptual model trainer 290. For explanatory purposes only, the dimensions of the subjective matrix 124 are N×M and the dimensions of the feature matrix 172 are N×F, where N is the number of training pairs, M is the number of human subjects, and F is the number of features. Corresponding rows of the subjective matrix 124 and the feature matrix 172 are associated with a single encoded training video. For example, the first row of each of the subjective matrix 124 and the feature matrix 172 could be associated with the encoded training video "A," while the second row of each the subjective matrix 124 and the feature matrix 172 could be associated with the encoded training video "B."

Upon receiving the subjective matrix 124, the subject aggregator 220 performs any number and type of aggregation operations on the raw opinion scores included in the subjective matrix 124 to compute the subjective vector 270. The subjective vector 270 includes, without limitation, a different aggregate subjective score for each of the N encoded training videos. For instance, in some embodiments, each aggregate subjective score is a mean opinion score (MOS) for a different encoded training video The subject aggregator 220 computes the MOS for a given encoded training video as the average of the raw opinions scores associated with the encoded training video. In this fashion, the subject aggregator 220 generates a single value for each row in the subjective matrix, and the dimensions of the subjective vector 270 are N×1.

Upon receiving the feature matrix 172, the row resampler 210 generates the resampled feature matrices 260(1)-260(Q). To generate the resampled feature matrix 260(x), the row resampler 210 performs resampling with replacement operations on the different rows included in the feature matrix 172. Since each of the rows is associated with a different encoded training video, the row resampler 210 indirectly performs resampling with replacement operations on the encoded training videos. Notably, the dimensions of each resampled feature matrix 260 match the dimensions of the feature matrix 172. Consequently, the dimensions of each resampled feature matrix 260 are N×F. However, each resampled feature matrix 260 typically includes multiple copies of one or more of the rows included in the feature matrix 172 and, therefore, is associated with a subset of the encoded training videos. For example, the feature matrix 172 could include 300 unique rows [row 0, row 1, row 2, . . . row 299] and the resampled feature matrix 260(1) could include the rows [row 0, row 0, row 299, row 52, row 299 . . . row 0].

As shown, the bootstrapping training engine 150 generates the baseline dataset 250 and the resampled database 170. The baseline dataset 250 includes, without limitation, the feature matrix 172 and the subjective vector 270. The resampled database 270 includes, without limitation, resampled datasets 280(1)-280(Q). The resampled dataset 280(x) includes, without limitation, the resampled feature matrix 260(x) and an associated modified version of the subjective vector 270'. The tick mark after the reference number 270 indicates a modified version of the subjective vector 270 that corresponds to the associated feature matrix 260(x).

In general, when generating the resampled dataset 280(x), the bootstrapping training engine 150 generates the associated modified version of the subjective vector 270' based on the aggregate subjective scores included in the subjective vector 270. More precisely, the bootstrapping training engine ensures that each row r of the subjective vector 270' and the corresponding row r of the resampled feature matrix 260(x) are associated with the same encoded training video. For example, suppose that the resampled feature matrix 260(x) included 300 copies of the row of feature values corresponding to the encoded training video "G." The bootstrapping training engine 150 would modify the subjective vector 270' to include 300 copies of the aggregate subjective score associated with the encoded training video "G." The subjective vector 270' is typically different for each resampled dataset 280.

In general, the perceptual model trainer 290 performs machine learning operations to generate a perceptual quality model that fuses the feature vector 174 associated with a portion of encoded video content into a perceptual quality score. The perceptual quality model trainer 290 may perform any number and type of machine learning operations based on any number and type of machine learning algorithms to generate the perceptual quality model. For instance, in some embodiments, the perceptual quality model trainer implements machine learning algorithms that recognize patterns between feature values and aggregate subjective scores.

For explanatory purposes only, (Q+1) instances of the perceptual model trainer 290(0)-290(Q) are depicted in FIG. 2. The perceptual model trainer 290(0) generates the baseline model 160 based on the baseline dataset 250. For each of the resampled dataset 280(x), the perceptual model trainer 290(x) generates the bootstrap model 162(x) based on the resampled dataset 280(x). In alternate embodiments, any number of instances of the perceptual model trainer 290 may execute in parallel, sequentially, or any combination thereof to generate the baseline model 160 and the bootstrap models 162. However, each bootstrap model 162 is trained independently of the other bootstrap models 162 and the baseline model 160.

Figure 3:
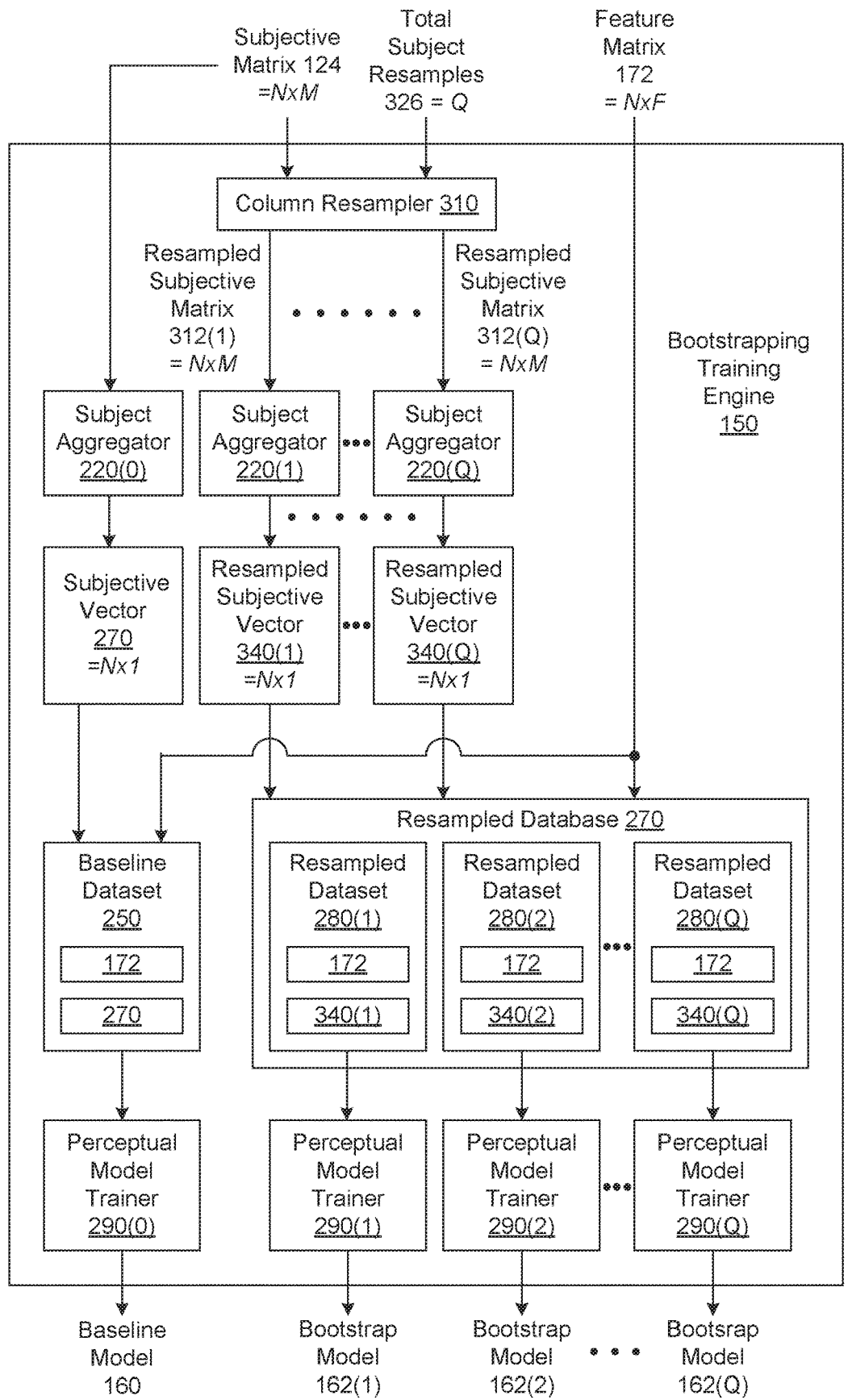
FIG. 3 is a more detailed illustration of the bootstrapping training engine of FIG. 1, according to other various embodiments of the present invention.

FIG. 3 is a more detailed illustration of the bootstrapping training engine 150 of FIG. 1, according to other various embodiments of the present invention. The bootstrapping training engine 150 depicted in FIG. 3 is configured to perform subjective bootstrapping. As shown, the bootstrapping training engine 150 generates the baseline model 160 and the bootstrap models 162(1)-162(Q) based on the feature matrix 172, the subjective matrix 174, and a total subject resamples 326. The total subject resamples 326 specifies the total number of resampled subjective vectors 340 that the bootstrapped training engine 150 generates. The total number of bootstrap models 162 that the bootstrapped training engine 150 generates is equal to the total number of resampled subjective vectors 340.

As shown, the bootstrapping training engine 150 includes, without limitation, a column sampler 310, the subject aggregator 220, the subjective vector 270, the resampled subjective vectors 340(1)-340(Q), the baseline dataset 250, the resampled database 270, and the perceptual model trainer 290. For explanatory purposes only, the dimensions of the subjective matrix 124 are N×M and the dimensions of the feature matrix 172 are N×F, where N is the number of training pairs, M is the number of human subjects, and F is the number of features. Corresponding rows of the subjective matrix 124 and the feature matrix 172 are associated with a single encoded training video.

Upon receiving the subjective matrix 124, the column resampler 310 generates the resampled subjective matrices 312(1)-312(Q). To generate the resampled subjective matrix 312(x), the column resampler 310 performs resampling with replacement operations on the different columns included in the subjective matrix 124. Since each column is associated with a different human subject, the column resampler 310 indirectly performs resampling with replacement operations based on the human subjects. Notably the dimensions of each resampled subjective matrix 312 match the dimensions of the feature matrix 172. Consequently, the dimensions of each resampled subjective matrix 312 are N×M. However, each resampled subjective matrix 312 typically includes multiple copies of the raw opinions scores associated with one or more of human subjects. For example, the subjective matrix 124 could include the raw opinions scores associated with 24 different human subjects, and the resampled subjective matrix 312(Q) could include 24 copies of the raw opinion scores associated with 1 of the 24 different human subjects.

For explanatory purposes only, (Q+1) instances of the subject aggregator 220(0)-(Q) are depicted in FIG. 3. The subject aggregator 220(0) generates the subjective vector 270 based on the subjective matrix 124. In a similar fashion, for each of the resampled subjective matrices 312(x), the subject aggregator 220(x) generates the resampled subjective vector 340(x) based on the resampled subjective matrix 312(x). The dimensions of each of the subjective vector 270 and the resampled subjective vectors 240 are N×1. In alternate embodiments, any number of instances of the subject aggregator 220 may execute in parallel, sequentially, or any combination thereof to generate the subjective vector 270 and the resampled subjective vectors 340.

As shown, the bootstrapping training engine 150 generates the baseline dataset 250 and the resampled database 170. The baseline dataset 250 includes, without limitation, the feature matrix 172 and the subjective vector 270. The resampled database 270 includes, without limitation, the resampled datasets 280(1)-280(Q). The resampled dataset 270(x) includes, without limitation, the feature 172 and the resampled subjective vector 340(x).

For explanatory purposes only, (Q+1) instances of the perceptual model trainer 290(0)-290(Q) are depicted in FIG. 3. The perceptual model trainer 290(0) generates the baseline model 160 based on the baseline dataset 250. For each of the resampled dataset 280(x), the perceptual model trainer 290(x) generates the bootstrap model 162(x) based on the resampled dataset 280(x). In alternate embodiments, any number of instances of the perceptual model trainer 290 may execute in parallel, sequentially, or any combination thereof to generate the bootstrap models 162. However, each bootstrap model 162 is trained independently of the other bootstrap models 162 and the baseline model 160.

Figure 4:
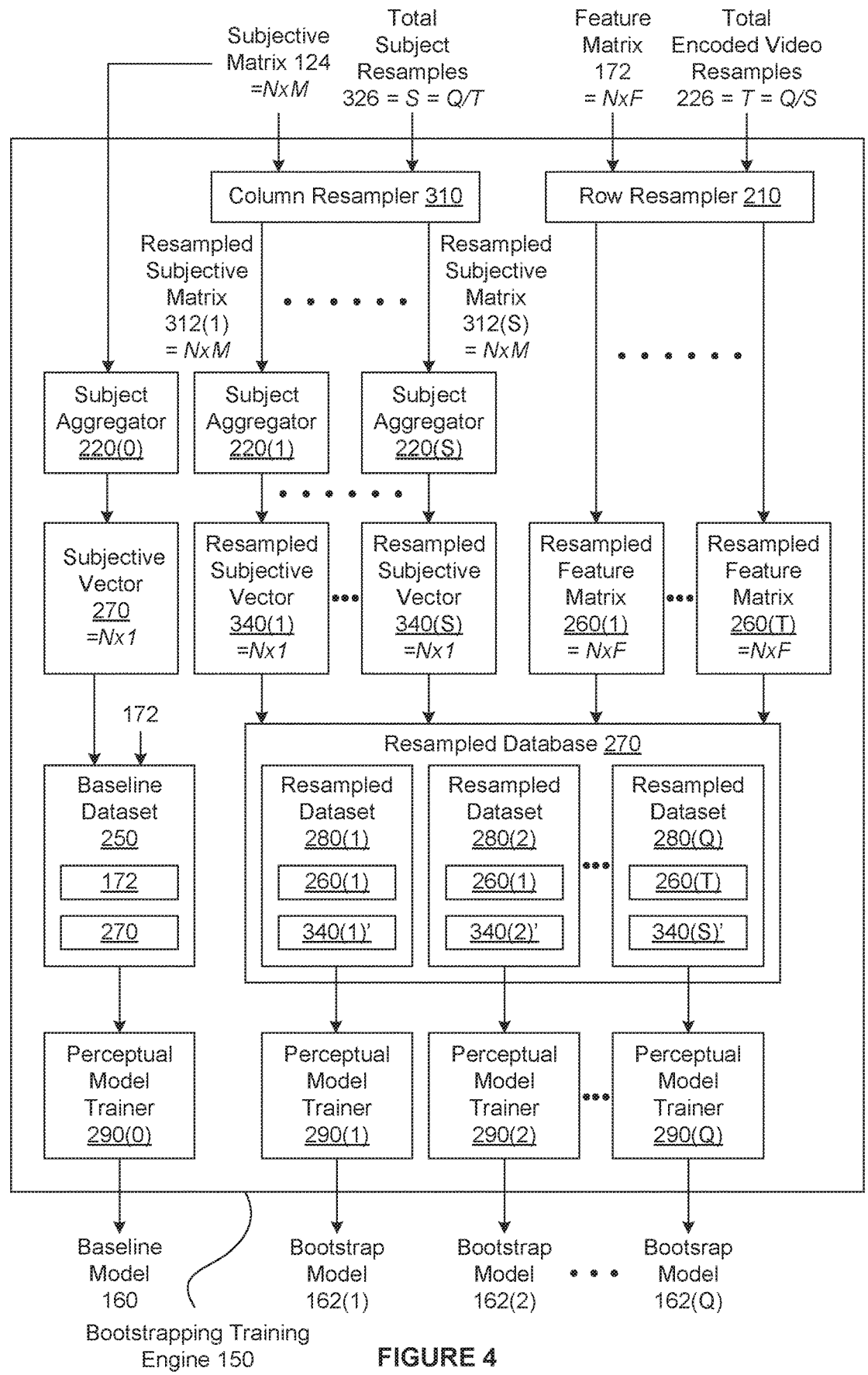
FIG. 4 is a more detailed illustration of the bootstrapping training engine of FIG. 1, according to yet other various embodiments of the present invention.

FIG. 4 is a more detailed illustration of the bootstrapping training engine 150 of FIG. 1, according to yet other various embodiments of the present invention. The bootstrapping training engine 150 depicted in FIG. 4 is configured to perform coupled bootstrapping. As shown, the bootstrapping training engine 150 generates the baseline model 160 and the bootstrap models 162(1)-162(Q) based on the feature matrix 172, the subjective matrix 174, the total encoded video resamples 226, and the total subject resamples 326. The total number of bootstrap models 162 that the bootstrapped training engine 150 generates is equal to the product of the total encoded video resamples 226 and the total subjective resamples 326. For explanatory purposes only, the total encoded video resamples 226 is equal to T, the total subject resamples 326 is equal to S, and the total number of bootstrap models 162 is equal to Q.

As shown, the bootstrapping training engine 150 includes, without limitation, the row resampler 210, the resampled feature matrices 260(1)-260(T), the column sampler 310, the subject aggregator 220, the subjective vector 270, the resampled subjective vectors 340(1)-340(S), the baseline dataset 250, the resampled database 270, and the perceptual model trainer 290. For explanatory purposes only, the dimensions of the subjective matrix 124 are N×M and the dimensions of the feature matrix 172 are N×F, where N is the number of training pairs, M is the number of human subjects, and F is the number of features. Corresponding rows of the subjective matrix 124 and the feature matrix 172 are associated with a single encoded training video.

Upon receiving the feature matrix 172, the row resampler 210 generates the resampled feature matrices 260(1)-260(T). As described previously in conjunction with FIG. 2, to generate the resampled feature matrix 260(x), the row resampler 210 performs resampling with replacement operations on the different rows included in the feature matrix 172. As shown, the dimensions of each resampled feature matrix 260 are N×F.

Upon receiving the subjective matrix 124, the column resampler 310 generates the resampled subjective matrices 312(1)-312(S). As described previously in conjunction with FIG. 3, to generate the resampled subjective matrix 312(x), the column resampler 310 performs resampling with replacement operations on the different columns included in the subjective matrix 124. As shown, the dimensions of each resampled subjective matrix 312 are N×M.

For explanatory purposes only, (S+1) instances of the subject aggregator 220(0)-(S) are depicted in FIG. 4. The subject aggregator 220(0) generates the subjective vector 270 based on the subjective matrix 124. In a similar fashion, for each of the resampled subjective matrices 312(x), the subject aggregator 220(x) generates the resampled subjective vector 340(x) based on the resampled subjective matrix 312(x). The dimensions of each of the subjective vector 270 and the resampled subjective vectors 240 are N×1. In alternate embodiments, any number of instances of the subject aggregator 220 may execute in parallel, sequentially, or any combination thereof to generate the subjective vector 270 and the resampled subjective vectors 340.

As shown, the bootstrapping training engine 150 generates the baseline dataset 250 and the resampled database 170. The baseline dataset 250 includes, without limitation, the feature matrix 172 and the subjective vector 270. The resampled database 270 includes, without limitation, the resampled datasets 280(1)-280(Q). Each resampled database 270 is a different combination of one of the resampled feature matrices 260 and an associated modified version of one of the resampled subjective vectors 340'. The tick mark after the reference number 340(x) indicates a modified version of the resampled subjective vector 340(x) that corresponds to the associated resampled feature matrix 260.

For example, as shown, the resampled dataset 280(Q) includes, without limitation, the resampled feature matrix 260(T) and an associated modified version of the resampled subjective vector 340(S)'. When generating the resampled dataset 280(Q), the bootstrapping training engine 150 generates the associated modified version of the resampled subjective vector 340(S)' based on the aggregate subjective scores included in the resampled subjective vector 340(S)'. More precisely, the bootstrapping training engine 150 ensures that each row r of the subjective vector 340(S)' and the corresponding row r of the resampled feature matrix 260(T) are associated with the same encoded training video.

For explanatory purposes only, (Q+1) instances of the perceptual model trainer 290(0)-290(Q) are depicted in FIG. 3. The perceptual model trainer 290(0) generates the baseline model 160 based on the baseline dataset 250. For each of the resampled dataset 280(x), the perceptual model trainer 290(x) generates the bootstrap model 162(x) based on the resampled dataset 280(x). In alternate embodiments, any number of instances of the perceptual model trainer 290 may execute in parallel, sequentially, or any combination thereof to generate the bootstrap models 162. However, each bootstrap model 162 is trained independently of the other bootstrap models 162 and the baseline model 160.

Figure 5A:
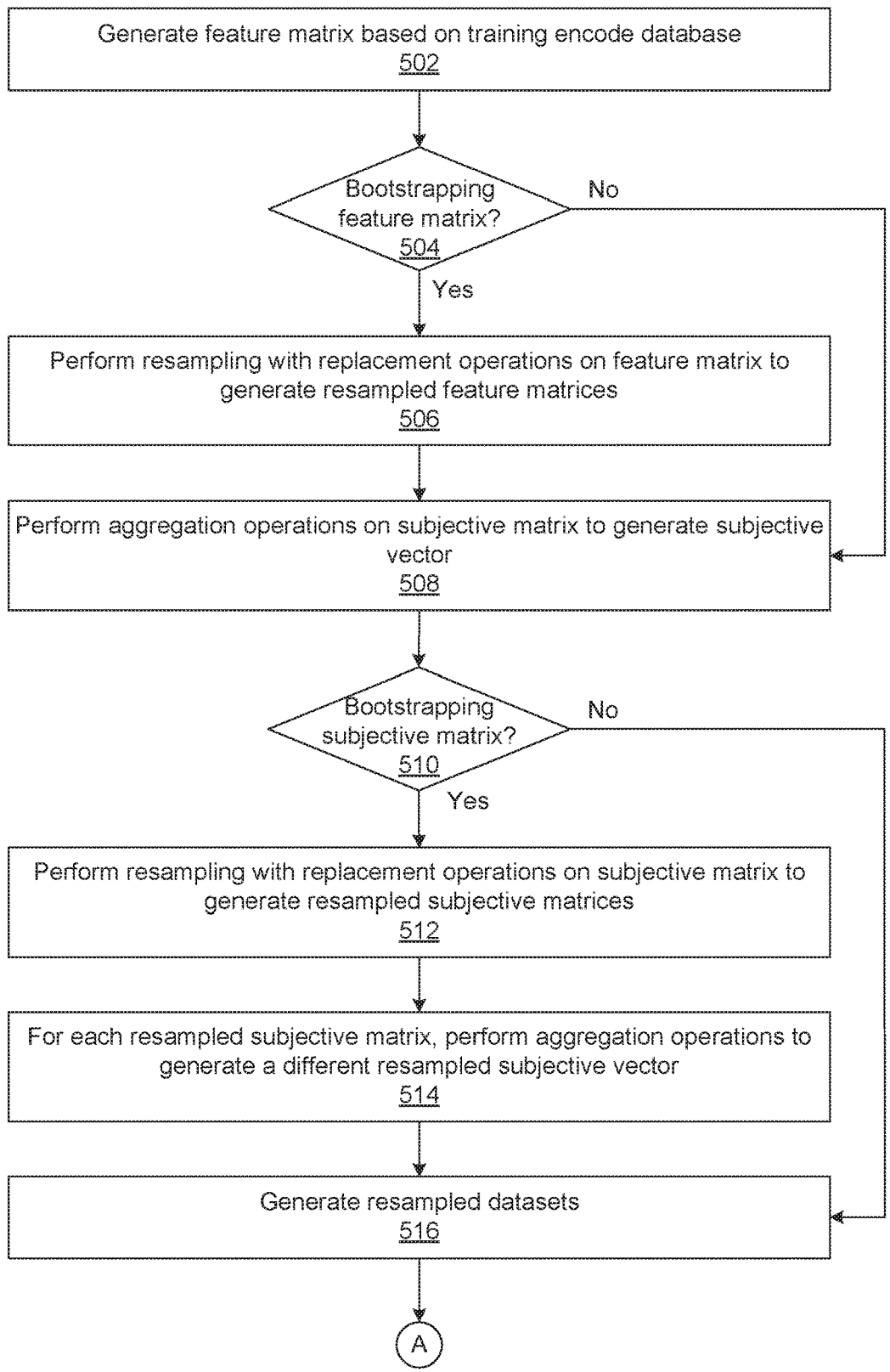
FIGS. 5A-5B set forth a flow diagram of method steps for quantifying the accuracy of a perceptual quality score, according to various embodiments of the present invention.
Figure 5B:
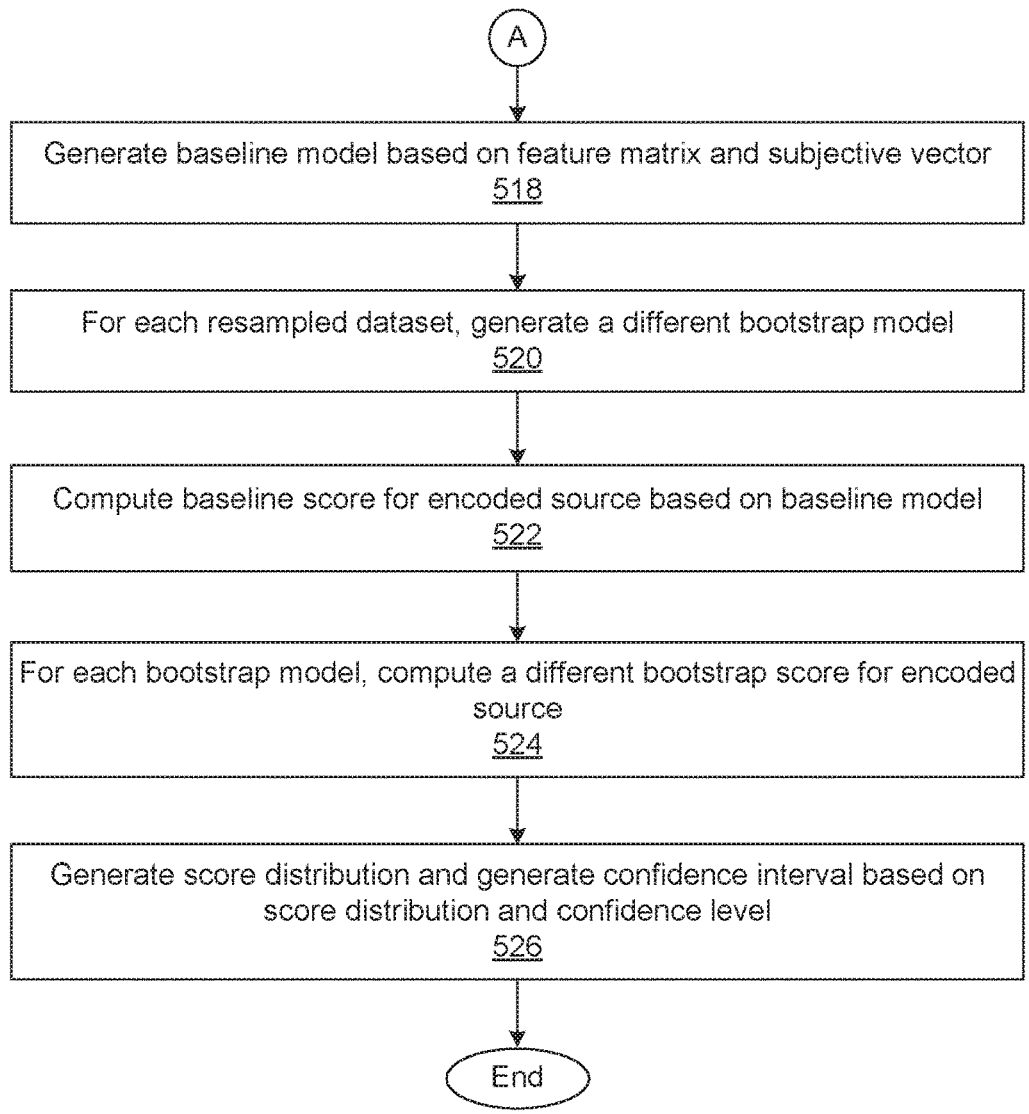

FIGS. 5A-5B set forth a flow diagram of method steps for quantifying the accuracy of a perceptual quality score, according to various embodiments of the present invention. Although the method steps are described with reference to the systems of FIGS. 1-4, persons skilled in the art will understand that any system configured to implement the method steps, in any order, falls within the scope of the present invention.

As shown, a method 500 begins at step 502, where the bootstrapping training subsystem 120 generates the feature matrix 172 based on the training encode database 122. At step 504, the bootstrapping training engine 150 determines whether the bootstrapping training engine 150 is configured to perform bootstrapping operations on the feature matrix 172. If, at step 504, the bootstrapping training engine 150 determines that the bootstrapping training engine 150 is not configured to perform bootstrapping operations on the feature matrix 172, then the method 500 proceeds directly to step 508.

If, however, at step 504, the bootstrapping training engine 150 determines that the bootstrapping training engine 150 is configured to perform bootstrapping operations on the feature matrix 172, then the method 500 proceeds to step 506. At step 506, the row resampler 210 performs resampling with replacement operations on the feature matrix 172 to generate the resampled feature matrices 260.

At step 508, the subject aggregator 220 performs aggregation operations on the subjective matrix 124 to generate the subjective vector 270. At step 510, the bootstrapping training engine 150 determines whether the bootstrapping training engine 150 is configured to perform bootstrapping operations on the subjective matrix 124. If, at step 510, the bootstrapping training engine 150 determines that the bootstrapping training engine 150 is not configured to perform bootstrapping operations on the subjective matrix 124, then the method 500 proceeds directly to step 516.

If, however, at step 510, the bootstrapping training engine 150 determines that the bootstrapping training engine 150 is configured to perform bootstrapping operations on the subjective matrix 124, then the method 500 proceeds to step 512. At step 512, the column resampler 310 performs resampling with replacement operations on the subjective matrix 124 to generate the resampled subjective matrices 312. At step 514, for each resampled subjective matrix 312(*i*), the subject aggregator 220 performs aggregation operations on the resampled subjective matrix 312(*i*) to generate the resampled subjective vector 340(*i*).

At step 516, the bootstrapping training engine 150 generates the resampled datasets 280. If the bootstrapping training engine 150 is configured to perform encode bootstrapping, then the bootstrapping training engine 150 generates the resampled datasets 170 based on the resampled feature matrices 260 and the subjective vector 270. If the bootstrapping training engine 150 is configured to perform subjective bootstrapping, then the bootstrapping training engine 150 generates the resampled datasets 170 based on the feature matrix 122 and the resampled subjective vectors 340. If the bootstrapping training engine 150 is configured to perform coupled bootstrapping, then the bootstrapping training engine 150 generates the resampled datasets 170 based on the resampled feature matrices 260 and the resampled subjective vectors 340.

At step 518, the perceptual model trainer 290 generates the baseline model 160 based on the feature matrix 172 and the subjective vector 270. At step 520, for each resampled dataset 280(*i*), the perceptual model trainer 290 generates the bootstrap model 162(*i*) based on the resampled dataset 280(*i*). At step 522, the prediction engine 180 computes the baseline score 184 for the encoded source video 174 based on the baseline model 160, the encoded source video 174, and the source video 172. At step 524, for each bootstrap model 162(*i*), the prediction engine 180 computes the bootstrap score 186(*i*) for the encoded source video 174 based on the bootstrap model 162(*i*), the encoded source video 174, and the source video 172. At step 526, the confidence engine 192 generates the score distribution 194 based on the bootstrap scores 186 and computes the confidence interval 198 based on the distribution 194 and the confidence level 196. The confidence application 190 transmits the baseline score 184, the score distribution 194, and/or the confidence interval 198 to any number of other software applications. The method 500 then terminates.

In some embodiments, one or more software applications use the confidence application 190, the baseline scores 184, the score distributions 194, and/or the confidence intervals 198 for any amount and type of encoded video content to fine-tune encoding operations. For instance, in some embodiments, an adaptive streaming application optimizes an encoding bitrate based on perceptual quality scores (e.g., values for a VMAF metric). The adaptive streaming application could be configured to cap the adaptive bitrate associated with encoded video content from above based on a perceptual quality score of 90. After ensuring that the perceptual quality score reaches 90, the adaptive streaming application would not further increase the adaptive bitrate, thereby saving bandwidth and reducing the re-buffering rates. However, because of the uncertainty associated with the perceptual quality score, the adaptive streaming application could be configured to increase conservatism based on the confidence level 196 of 95%. For example, if the confidence interval 198 was 87-93 for the baseline score 184 of 90, then the adaptive streaming application could cap the adaptive bitrate at 93 instead of 90.

In a similar manner, the adaptive streaming application could be configured to cap the adaptive bitrate associated with encoded video content from below based on the perceptual quality score. In particular, in a streaming start-up phase, the adaptive streaming application could set the adaptive bitrate based on an initially acceptable perceptual quality score of 60. However, because of the uncertainty associated with the perceptual quality score, the adaptive streaming application could be configured to increase conservatism based on the confidence level 196 of 95%. For example, if the confidence interval 198 was 53-67 for the baseline score 184 of 60, then the adaptive streaming application could initially set the adaptive bitrate based on the baseline score 184 of 67 instead of 60.

Quantifying the Significance of BD-Rate Values Based on Bootstrap Models

In some embodiments, after the training phase, the bootstrapping training subsystem 120 transmits the baseline model 160 and the bootstrap models 162 to any number of software applications, subsystems, or systems in addition to or instead of the confidence application 190. In particular, in various embodiments, the bootstrapping training subsystem 120 transmits the baseline model 160 and the bootstrap models 162 to a Bjontegaard's delta rate (BD-rate) comparison application.

In some embodiments, the BD-rate comparison application computes Bjontegaard delta rate (BD-rate) values using the baseline model 160 to compare the performance of a test codec to the performance of a reference codec. A BD-rate value is also referred to herein as "a value for a BD-rate." Each BD-rate typically specifies a percentage bitrate change when encoding using the test codec relative to encoding using the reference codec while maintaining the same baseline score 184. Notably, the bootstrap models 162 enable the BD-rate comparison application to automatically quantify the accuracy of the BD-rate values. FIGS. 6-9 describe an exemplary BD-rate significance system that includes, without limitation, a BD-rate comparison application.

Figure 6:
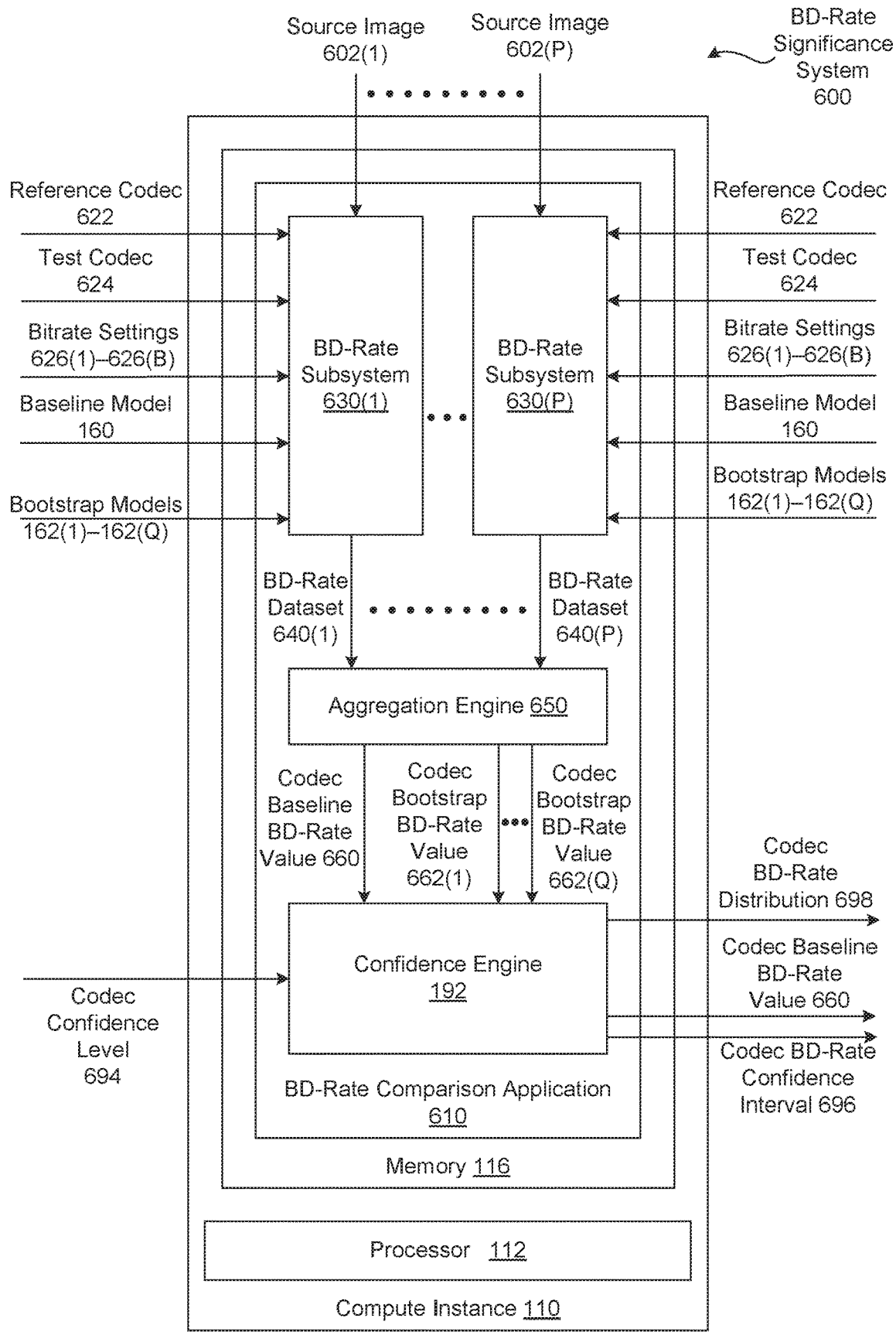
FIG. 6 is a conceptual illustration of a Bjontegaard's delta rate (BD-rate) significance system configured to implement one or more aspects of the present invention.

FIG. 6 is a conceptual illustration of a Bjontegaard's delta rate ("BD-rate") significance system 600 configured to implement one or more aspects of the present invention. For explanatory purposes, the BD-rate significance system 600 is described in the context of comparing the performance of a test codec to the performance of a reference codec based on BD-rates. However, as persons skilled in the art will recognize, the disclosed techniques may be applied to compare the performance of any type of test encoding configuration to the performance of any type of reference encoding configuration based on any number and type of applicable comparison metrics instead of or in addition to the BD-rate.

As referred to herein, an "encoding configuration" is a combination of an encoder and a configuration. The configuration specifies values for any number and type of parameters that customize the encoder. The parameters associated with the configuration are also referred to herein as "configuration parameters." A configuration parameter may be any parameter, option, mode, setting, etc., that impacts the encoding operations performed by the encoder. Examples of configuration parameters include, without limitation, a profile level, an analysis level, a search level, a psycho-visual option, a performance option, a tuning option, and so forth. Accordingly, in alternate embodiments, the BD-rate significance system 100 may be used to compare the performance of different parameter sets for a single codec.

As shown, the BD-rate significance system 100 includes, without limitation, the compute instance 110. In alternate embodiments, the BD-rate significance system 100 may include any number of compute instances 110. Further, any number of the compute instances 110 may be distributed across multiple geographic locations or implemented in one or more cloud computing environments (i.e., encapsulated shared resources, software, data, etc.) in any combination.

A BD-rate comparison application 610 resides in the memory 116 and executes on the processor 112 of the compute instance 110. The BD-rate comparison application 610 is also referred to herein as the "encoding metric comparison application." The BD-rate comparison application 610 computes a codec baseline BD-rate value 660, a codec BD-rate distribution 698, and a codec BD-rate confidence interval 696 based on a test codec 624, a reference codec 622, bitrate settings 626(1)-626(B), the baseline model 160, the bootstrap models 162(1)-162(Q), and source images 602(1)-602(P). Each of the source images 602 may be any type of image expressed in any format. In alternate embodiments, each of the source images 602 may be replaced with any portion and type of video content. For explanatory purposes only, B is the number of different bitrate settings, Q is the number of different bootstrap models 162, and P is the number of different source image 602.

The test codec 624 specifies an encoding configuration for evaluation, while the reference codec 622 specifies an encoding configuration to which the test codec 624 is to be compared. Each of the bitrate settings 626 species a different value for a target bitrate configuration parameter that impacts the encoding operations performed by the test codec 624 and the reference codec 622. For example, the bitrate settings 626 could include, without limitation, the eight values 0.05 bits per pixel (bpp), 0.12 bpp, 0.25 bpp, 0.50 bpp, 0.75 bpp, 1.00 bpp, 1.50 bpp, and 2.00 bpp. In alternate embodiments, the bitrate settings 626 may be replaced with values for any configuration parameter that impacts the encoding operations performed by the test codec 624 and the reference codec 622.

As shown, the BD-rate comparison application 610 includes, without limitation, a BD-rate subsystem 630, an aggregation engine 650, and the confidence engine 192. For explanatory purposes only, P instances of the BD-rate subsystem 630 are depicted in FIG. 6. The BD-rate subsystem 630(x) generates a BD-rate dataset 640(x) based on the source image 602(x), the reference codec 622, the test codec 624, the bitrate settings 626, the baseline model 160, and the bootstrap models 162. Accordingly, the BD-rate dataset 640(x) is associated with the source image 602(x). In alternate embodiments, any number of instances of the BD-rate subsystem 630 may execute in parallel, sequentially, or any combination thereof to generate the BD-rate datasets 640(1)-640(P).

Figure 7:
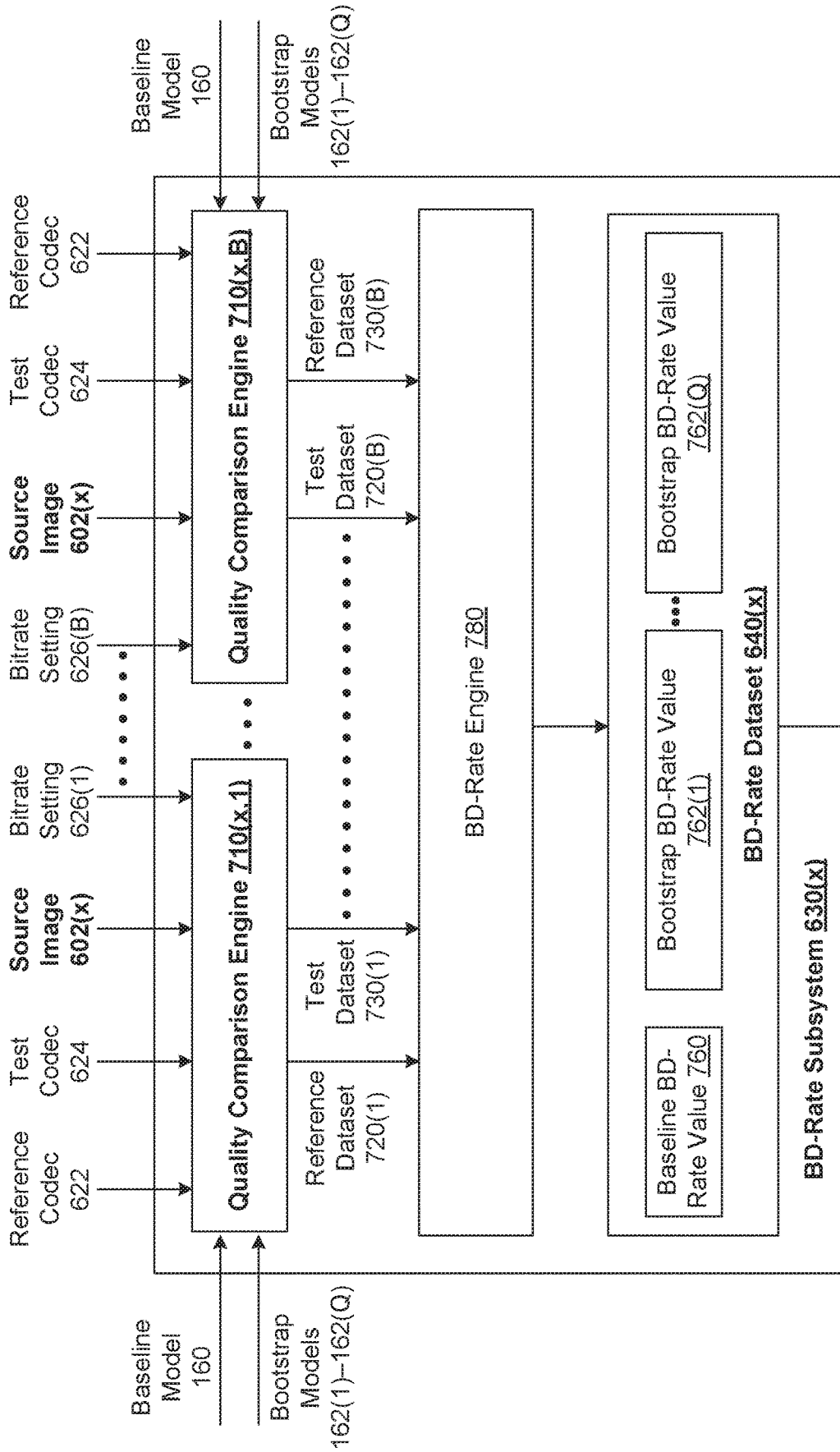
FIG. 7 is a more detailed illustration of one of the BD-rate subsystems of FIG. 6, according to various embodiments of the present invention.

As described in greater detail in conjunction with FIG. 7, the BD-rate dataset 640(x) includes, without limitation, a baseline BD-rate value, and Q bootstrap BD-rate values. Each of the baseline BD-rate value and the bootstrap BD-rate values included in the BD-rate dataset 640(x) specifies a bitrate change when encoding the source image 602(x) using the test codec 624 relative to encoding the source image 602(x) using the reference codec 622 while maintaining the same baseline score 180. Each of the baseline BD-rate value and the bootstrap BD-rate values is expressed as a percentage. In alternate embodiments, each of the baseline BD-rate value and the bootstrap BD-rate values included in the BD-rate dataset 640(x) may express a performance difference between the test codec 624 and the reference codec 622 when encoding the source image 602(x) in any technically feasible fashion.

Figure 8:
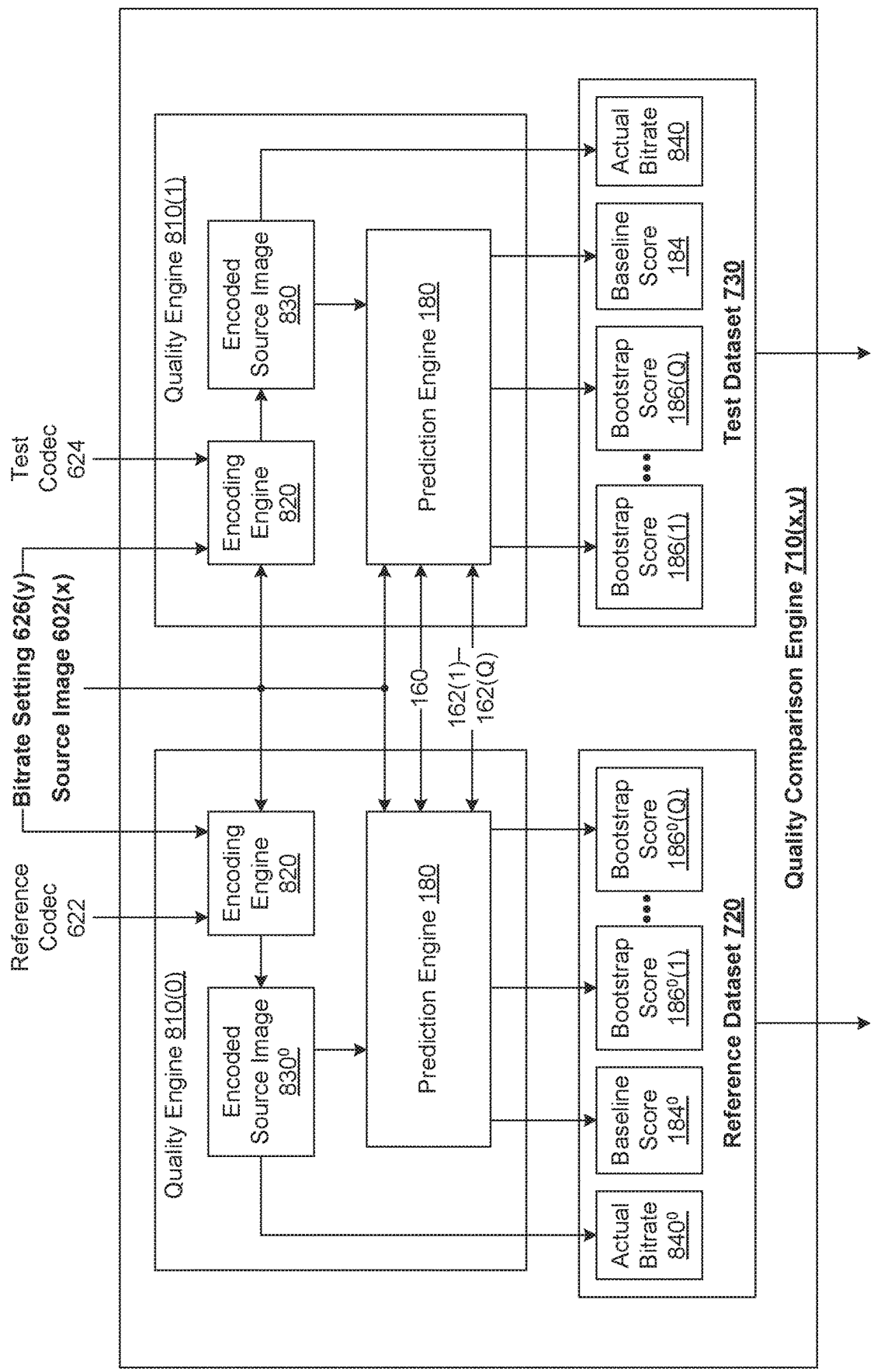
FIG. 8 is a more detailed illustration of one of the quality comparison engines of FIG. 7, according to various embodiments of the present invention.

As described in greater detail in conjunction with FIGS. 7-8, to generate the BD-rate dataset 640(x), the BD-rate subsystem 630(x) generates 2×B encoded source images based on the source image 602(x). Each encoded source image is associated with a different combination of codec (i.e., the test codec 624 or the reference codec 622) and bitrate setting 626. For example, for six bitrate settings 626, the BD-rate subsystem 630(x) generates twelve different encoded source images based on the source image 602(x). For each of the encoded source images, the BD-rate subsystem 630(x) computes the actual bitrate, the baseline score 184 based on the baseline model 160, and the bootstrap scores 186(1)-186(Q) based on, respectively, the bootstrap models 162(1)-162(Q).

The BD-rate subsystem 630(x) then computes the baseline BD-rate value for the source image 602(x) based on the actual bitrates and the baseline scores 184. Similarly, for each of the Q bootstrap models 162, the BD-rate subsystem 630(x) computes a different bootstrap BD-rate value based on the actual bitrates and the bootstrap scores 184 computed based on the bootstrap model 162. Finally, the BD-rate subsystem 630(x) generates the BD-rate dataset 640(x) that includes, without limitation, the baseline BD-rate value, and the Q bootstrap BD-rate values that are associated with the source image 601(x).

Subsequently, the aggregation engine 650 generates the codec baseline BD-rate value 660 based on the BD-rate values included in the BD-rate datasets 640(1)-640(P). The codec baseline BD-rate value 660 specifies a bitrate change when encoding using the test codec 624 relative to encoding using the reference codec 622 while maintaining the same baseline score 184. The codec baseline BD-rate value 660 is expressed as a percentage and reflects 2*P*B encoded source images derived from the P source images 602. In alternate embodiments, the codec baseline BD-rate value 600 may express a performance difference between the test codec 624 and the reference codec 622 in any technically feasible fashion.

In a similar fashion, for each of the bootstrap models 162(x), the aggregation engine 650 generates the codec bootstrap BD-rate value 662(x) based on the subset of BD-rate values included in the BD-rate datasets 640(1)-640(P) that is associated with the bootstrap model 162(x). The codec bootstrap BD-rate value 662(x) specifies a bitrate change when encoding using the test codec 624 relative to encoding using the reference codec 622 while maintaining the same bootstrap score 186 as per the bootstrap model 162(x). The codec bootstrap BD-rate value 662(x) is expressed as a percentage and reflects 2*P*B encoded source images derived from the P source images 602. In alternate embodiments, the codec bootstrap BD-rate value

662(*x*) may express a performance difference between the test codec 624 and the reference codec 622 in any technically feasible fashion.

The aggregation engine 650 may perform any number and type of operations (e.g., transformation operations, aggregation operations, etc.) on the BD-rate datasets 640(1)-640(P) to generate the codec baseline BD-rate value 660 and codec bootstrap BD-rate values 662(1)-662(Q). For instance, in some embodiments, the aggregation engine 650 computes the codec baseline BD-rate value 660 as the mean of the baseline BD-rate values included in the BD-rate datasets 640(1)-640(P). In a similar fashion, the aggregation engine 650 computes each of the codec bootstrap BD-rate values 662(*q*) as the mean of the subset of bootstrap BD-rate values included in the BD-rate datasets 640(1)-640(P) that is associated with the bootstrap model 162(*q*).

In other embodiments, the aggregation engine 650 computes the codec baseline BD-rate value 660 as a geometric average of the baseline BD-rate values included in the BD-rate datasets 640(1)-640(P). For each of the baseline BD-rate values, the aggregation engine 650 computes a corresponding transformed baseline BD-rate value based on the following equation (1):

$$\text{transformed BD-rate value} = 1 + \text{BD-rate value}/100 \quad (1)$$

The transformed baseline BD-rate values enable meaningful geometric averaging of the baseline BD-rate values. The aggregation engine 650 then computes a geometric mean of the P transformed BD-rate values to generate a transformed geometry average. Subsequently, the aggregation engine 650 computes the codec baseline BD-rate based on the following equation (2):

$$\text{codec BD-rate value} = 100 \times (\text{transformed geometry average} - 1) \quad (2)$$

The aggregation engine computes each of the codec bootstrap BD-rate values 662 in a similar fashion.

Upon receiving the codec baseline BD-rate value 660 and the codec bootstrap BD-rate values 662, the confidence engine 192 generates the codec BD-rate distribution 698 that includes, without limitation, the codec bootstrap scores 662(1)-662(Q). Advantageously, as persons skilled in the art will recognize, the codec BD-rate distribution 698 quantifies the accuracy of the codec baseline BD-rate value 660. Further, the confidence engine 192 computes the codec BD-rate confidence interval 696 based on the codec BD-rate distribution 698 and a codec confidence level 196.

The confidence engine 192 may compute the codec BD-rate confidence interval 696 in any technically feasible fashion. For example, to compute the codec BD-rate confidence interval 696 for the confidence level of 95%, the confidence engine 196 could determine the interval that excludes the lowest 2.5% of the codec bootstrap scores 662(1)-662(Q) and the highest 2.5% of the codec bootstrap scores 662(1)-662(Q). Advantageously, the codec BD-rate confidence interval 696 quantifies the accuracy of the baseline score 184.

Subsequently, the confidence engine 162 transmits the codec baseline BD-rate value 660, the codec BD-rate distribution 698, and/or the codec BD-rate confidence interval 696 to any number of software applications. Advantageously, by quantifying the accuracy and significance of the codec baseline BD-rate value 660, each of the codec BD-rate distribution 698, and the codec BD-rate confidence interval 696 enables developers and software applications to draw valid conclusions and reliably optimize encoding operations based on the codec baseline BD-rate value 660.

For instance, if a software application determines that the BD-rate value of zero is within the codec BD-rate confidence interval 696, then the software application could determine that the bitrate performance difference between the test codec 624 and the reference codec 622 is statistically insignificant. As a result, the software application could forgo re-encoding source videos 172 based on the test codec 624, saving both time and computing resources.

In various embodiments, the confidence engine 162 may transmit any amount and type of data associated with the codec baseline BD-rate value 660 and/or the codec bootstrap BD-rate values 662 to any number of software applications that may then perform any amount of analysis based on the codec baseline BD-rate value 660 and/or the codec bootstrap scores 662. In alternate embodiments, the confidence engine 192 may be replaced or supplemented with an analysis engine that performs any type of statistical analysis based on the codec BD-rate distribution 698 to generate any number and type of accuracy, variability, uncertainty, and/or confidence metrics associated with the codec baseline BD-rate value 660.

In some alternate embodiments, the source images 602 are replaced with portions of source video content, and a content analysis engine performs any amount and type of content analysis operations based on the codec BD-rate distribution 698, the portions of source video content, the BD-rate datasets 640, the codec baseline BD-rate value 660, and/or the codec bootstrap BD-rates values 552. For instance, the content analysis engine could identify types of source video content for which the test codec 624 typically underperforms the reference codec 622 based on the left side of the codec BD-rate distribution 698. Similarly, the analysis engine could identify types of source video content for which the test codec 624 typically outperforms the reference codec 622 based on the right side of the codec BD-rate distribution 698.

Although not shown, the BD-rate comparison application 610 and/or different instances of the BD-rate comparison application 610 may execute sequentially, concurrently, or any combination thereof to generate the codec baseline BD-rate value 660, the codec bootstrap BD-rate values 662, the codec BD-rate distribution 698, and/or the codec BD-rate confidence intervals 696 for any number of different test codecs 624. Subsequently, a multi-codec comparison application (not shown) may perform any amount and type of statistical and/or significance testing based on the codec BD-rate distributions 698.

For instance, in some alternate embodiments, a multi-codec comparison application may perform a non-parametric, two-sample Kolmogorov Smirnov test based on the BD-rate distributions 698 associated with two different test codecs 624. The result of the Kolmogorov Smirnov test is a p value that indicates the similarity of the BD-rate distributions 698. In general, as the similarity between the BD-rate distributions 698 increases, the p value also increases. In the same or other alternate embodiments, a multi-codec comparison application may compare BD-rate distributions using quantile functions.

Note that the techniques described herein are illustrative rather than restrictive, and may be altered without departing from the broader spirit and scope of the invention. In particular, the BD-rate subsystem 630, the aggregation engine 650, and the confidence engine 192 may be implemented in any number of software applications in any combination. Further, in various embodiments, any number of the techniques disclosed herein may be implemented while other techniques may be omitted in any technically feasible fashion.

Many modifications and variations on the functionality provided by BD-rate subsystem 630, the aggregation engine 650, and the confidence engine 192 will be apparent to those of ordinary skill in the art without departing from the scope and spirit of the described embodiments. Alternate embodiments include, without limitation, quantifying the accuracy of codec BD-rates based on any type of bootstrap models and/or any type of bootstrapping operations.

For instance, in alternate embodiments, the BD-rate subsystem 630 is modified to generate a baseline BD-rate value of each of the source images 602 based on an objective quality metric (e.g., Peak Signal to Noise Ratio). The aggregation engine 650 computes the codec baseline BD-rate value based on the baseline BD-rate values for the different source images. In addition, the aggregation engine 650 performs bootstrapping operations on the baseline BD-rate values based on the source images 602 to generate the codec bootstrap BD-rate values. In other alternate embodiments, the aggregation engine 650 is modified to perform bootstrapping operations on the BD-rate datasets 640(1)-640(P) based on the source images 602(1)-602(P).

In general, the BD-rate subsystem 630 may perform bootstrapping based on the source images 602 irrespective of whether bootstrapping was used to capture the uncertainty when training the quality metric used to compute the BD-rate values. As previously described in conjunction with FIGS. 1-5B, encode bootstrapping, subjective bootstrapping, and coupled bootstrapping are used to mitigate sources of uncertainty during the training of the baseline model 160. By contrast, performing bootstrapping based on the source images 602(1)-602(P) mitigates a source of uncertainty associated with the selection of the source images 602 that are used to compute the BD-rate values. For example, if the source images 602 are not representative of the types of video content observed in practice, then the derived BD-rate value will not be reflective of the actual performance of the test codec 624.

In particular, bootstrapping based on the source images 602 is useful for standardized video codec testing when the source images 602 that are selected may perform better using the test codec 624 than using the reference codec 622. In such situations, performing bootstrapping on the source images 602 to generate the codec BD-rate distribution 698 is substantially more informative than generating the codec baseline BD-rate value 660 alone. Further, performing bootstrapping based on the source images 602 can provide insight into which types of video content typically benefit from encoding using the test codec 624 and which types of video content do not typically benefit from encoding using the test codec 624.

Computing BD-Rate Values

FIG. 7 is a more detailed illustration of one of the BD-rate subsystems 630(x) of FIG. 6, according to various embodiments of the present invention. As shown, the BD-rate subsystem 630(x) generates the BD-rate dataset 640(x) based on the source image 602(x), the test codec 624, the reference codec 622, the bitrate settings 626(1)-626(B), the baseline model 160, and the bootstrap models 162(1)-162(Q).

The BD-rate subsystem 630(x) includes, without limitation, the quality comparison engine, a BD-rate engine 780, and the BD-rate dataset 640(x). For explanatory purposes only, B instances of the quality comparison engine 710 are depicted as the quality comparison engine 710(x, 1)-710(x, B). The first parenthetical number specifies the input source image 602 and the second parenthetical number specifies the input bitrate setting 626.

For example, the quality comparison engine 710(x, 1) computes a reference dataset 720(1) and a test dataset 730(1) based on the source image 602(x), the bitrate setting 626(1), the test codec 624, the reference codec 622, the baseline model 160, and the bootstrap models 162. By contrast, the quality comparison engine 710(x, B) computes the reference dataset 720(B) and the test dataset 730(B) based on the source image 602(x), the bitrate setting 626(B), the test codec 624, the reference codec 622, the baseline model 160, and the bootstrap models 162. In alternate embodiments, any number of instances of the quality comparison engine 710 may execute in parallel, sequentially, or any combination thereof to generate the reference datasets 720 and the test datasets 730.

The quality comparison engine 710(x, y) generates the reference dataset 720 and the test dataset 730 associated with both the source image 602(x) and the bitrate setting 626(y). To generate the reference dataset 720, the quality comparison engine 710(x, y) configures an instance of a quality engine (not shown in FIG. 7) to generate the reference dataset 720 based on the reference codec 622, the source image 602(x), the bitrate setting 626(y), the baseline model 160, and the bootstrap models 162. The reference dataset 720 includes, without limitation, an actual bitrate, the baseline score 184, and the bootstrap scores 186 associated with an encoded source image generated based on the reference codec 622, the source image 602(x), and the bitrate setting 626(y).

The quality comparison engine 710(x, y) also configures an instance of the quality engine to generate the test dataset 730 based on the test codec 624, the source image 602(x), the bitrate setting 626(y), the baseline model 160, and the bootstrap models 162. The test dataset 730 includes, without limitation, the actual bitrate, the baseline score 184, and the bootstrap scores 186 associated with an encoded source image generated based on the test codec 624, the source image 602(x), and the bitrate setting 626(y). The quality comparison engine 710 is described in greater detail in conjunction with FIG. 8.

The BD-rate engine 780 computes the BD-rate dataset 640(x) based on the reference datasets 720(1)-720(B) and the test datasets 730(1)-730(B). The BD-rate engine 780 computes a baseline BD-rate value 760 based on the actual bitrates and the baseline scores 184 included in the reference datasets 720 and the test datasets 730. For each bootstrap model 162(q), the BD-rate engine 780 computes a different bootstrap BD-rate value 762(q) based on the actual bitrate and the subset of bootstrap scores 186(q) included in the reference datasets 720 and the test datasets 730 that are associated with the bootstrap model 162(q). The BD-rate engine 780 may perform any number and type of BD-rate computation operations as known in the art to compute each of the baseline BD-rate value 760 and the bootstrap BD-rate values 762(1)-762(Q).

The BD-rate engine 780 then generates the BD-rate dataset 640(x) that includes, without limitation, the baseline BD-rate value 760 and the bootstrap BD-rate values 762(1)-762(Q). Each of the baseline BD-rate value 760 and the bootstrap BD-rate values 762 specifies a different bitrate change when encoding the source image 602(x) using the test codec 624 relative to encoding the source image 602(x) using the reference codec 622 while maintaining the same baseline score 184. In alternate embodiments, each of the baseline BD-rate value 760 and the bootstrap BD-rate values 762 may express a performance difference between the test codec 624 and the reference codec 622 when encoding the source image 602(x) in any technically feasible fashion.

FIG. 8 is a more detailed illustration of one of the quality comparison engines 710(x, y) of FIG. 7, according to various embodiments of the present invention. The quality comparison engine 710(x, y) includes, without limitation, a quality engine 810, the reference dataset 720, and the test dataset 730. For explanatory purposes only, two instances of the quality engine 810 are depicted as the quality engines 810(0) and 810(1).

As shown, the quality engine 810(0) computes the reference dataset 720 based on the source image 602(x), the bitrate setting 626(y), the reference codec 622, the baseline model 160, and the bootstrap models 162. The quality engine 810(1) computes the test dataset 730 based on the source image 602(x), the bitrate setting 626(y), the test codec 624, the baseline model 160, and the bootstrap models 162. In alternate embodiments, a single instance of the quality engine 810 may generate the reference dataset 720 based on the reference codec 622 and the test dataset 730 based on the test codec 624.

The quality engine 810 includes, without limitation, an encoding engine 820, an encoded source image 830, and a prediction engine 180. For explanatory purposes only, the functionality of the quality engine 810 is described herein with reference to a target codec. For the quality engine 810(0), the target codec is the reference codec 622. For the quality comparison engine 810(1), the target codec is the test codec 624. Further, a zero superscript is appended to certain reference numbers to distinguish that the associated element is derived based on the reference codec 622 and not the test codec 624. For instance, an encoded source image $830^0$ is encoded using the reference codec 622 and the encoded source image 830 is encoded using the test codec 624.

Upon receiving the source image 602(x), the bitrate setting 626(y), the baseline model 160, the bootstrap models 162 and the target codec (either the reference codec 622 or the test codec 624), the encoding engine 820 encodes the source image 602(x) based on the target codec and the bitrate setting 626(y) to generate the encoded source image 830. The quality engine 810 computes an actual bitrate based on the encoded source image 830. The prediction engine 180 computes the baseline score 184 and the bootstrap scores 186 based on the encoded source image 830, the source image 602(x), the baseline model 160, and the bootstrap models 162. The prediction engine 180 was described in detail previously in conjunction with FIG. 1.

If the target codec is the reference codec 622, then the quality engine 810 generates the reference dataset 720 that includes, without limitation, the actual bitrate $840^0$, the baseline score $184^0$, and the bootstrap scores $186^0$ associated with the source image 602(x), the bitrate setting 626(y) and the reference codec 622. If the target codec is the test codec 624, then the quality engine 810 generates the test dataset 730 that includes, without limitation, the actual bitrate 840, the baseline score 184, and the bootstrap scores 186 associated with the source image 602(x), the bitrate setting 626(y) and the test codec 624.

Figure 9:
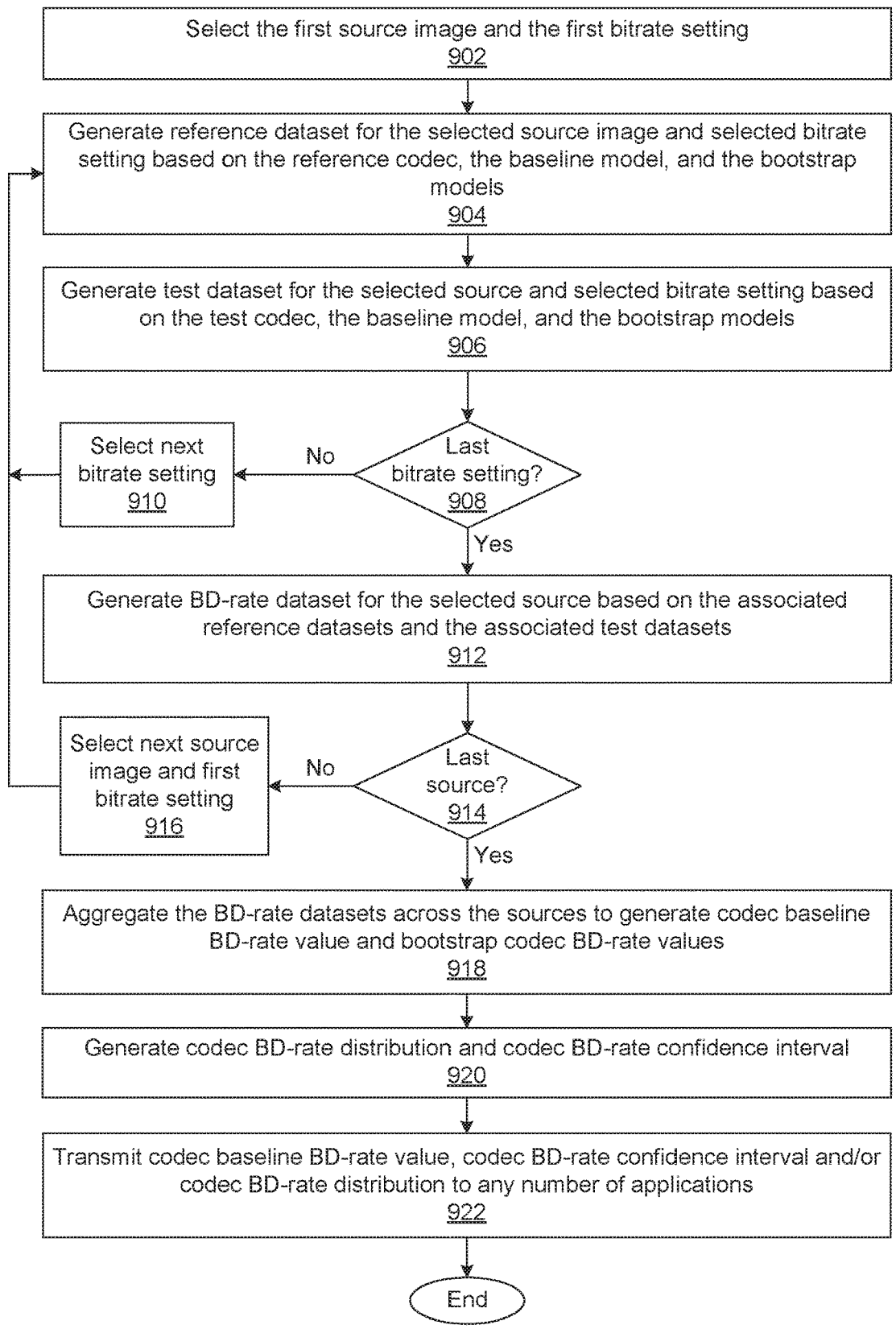
FIG. 9 is a flow diagram of method steps for quantifying the accuracy of a BD-rate, according to various embodiments of the present invention.

FIG. 9 is a flow diagram of method steps for quantifying the accuracy of a BD-rate, according to various embodiments of the present invention. Although the method steps are described with reference to the systems of FIGS. 6-8, persons skilled in the art will understand that any system configured to implement the method steps, in any order, falls within the scope of the present invention.

As shown, a method 900 begins at step 902, where the BD-rate comparison application 610 selects the first source image 602 and the BD-rate subsystem 630 selects the first bitrate setting 626. At step 904, the quality engine 810 generates the reference dataset 720 for the selected source image 602 and the selected bitrate setting 626 based on the reference codec 622, the baseline model 160, and the bootstrap models 162. At step 906, the quality engine 810 generates the test dataset 730 for the selected source image 602 and the selected bitrate setting 626 based on the test codec 624, the baseline model 160, and the bootstrap models 162.

At step 908, the BD-rate subsystem 630 determines whether the selected bitrate setting 626 is the last bitrate setting 626. If, at step 908, the BD-rate subsystem 630 determines that the selected bitrate setting 626 is the last bitrate setting 626, then the method 900 proceeds directly to step 912. If, however, at step 908, the BD-rate subsystem 630 determines that the selected bitrate setting 626 is not the last bitrate setting 626, then the method 900 proceeds to step 910. At step 910, the BD-rate subsystem 630 selects the next bitrate setting 626. The method 900 then returns to step 904, where the quality engine 810 generates the reference dataset 720 for the selected source image 602 and the newly selected bitrate setting 626.

If, however at step 908, the BD-rate subsystem 630 determines that the selected bitrate setting 626 is the last bitrate setting 626, then the method 900 proceeds to directly to step 912. At step 912, the BD-rate engine 780 generates the BD-rate dataset 640 for the selected source image 602 based on the reference datasets 720 associated with the source image 602 and the test datasets 730 associated with the selected source image 602.

At step 914, the BD-rate comparison application 610 determines whether the selected source image 602 is the last source image 602. If, at step 914, the BD-rate comparison application 610 determines that the selected source image 602 is not the last source image 602, then the method 900 proceeds to step 916, At step 916, the BD-rate comparison application 610 selects the next source image 602 and the BD-rate subsystem 630 selects the first bitrate setting 626. The method 900 then returns to step 904, where the quality comparison engine 710 generates the reference dataset 720 for the newly selected source image 602 and the newly selected bitrate setting 626.

If, however, at step 914, the BD-rate comparison application 610 determines that the selected source image 602 is the last source image 602, then the method 900 proceeds directly to step 918. At step 918, the aggregation engine 650 aggregates the BD-rate datasets 640 across the source images 602 to generate the codec baseline BD-rate value 660 and the codec bootstrap BD-rate values 662. At step 920, the confidence engine 192 generates the codec BD-rate distribution 698 based on the codec bootstrap BD-rate values 662 and computes the codec BD-rate confidence interval 696 based on the codec BD-rate distribution 698 and the codec confidence level 694. Advantageously, each of the codec BD-rate distribution 698 and the codec BD-rate confidence interval 696 quantifies the accuracy of the codec baseline BD-rate value 660. At step 922, the BD-rate comparison application 610 transmits the codec baseline BD-rate value 660, the codec BD-rate distribution 698, and/or the codec BD-rate confidence interval 696 to one or more software applications for evaluation operations associated with the test codec 624. The method 900 then terminates.

In sum, the disclosed techniques may be used to quantify the accuracy of perceptual quality scores. In some embodiments, a training subsystem generates a feature matrix based on a training encode database that includes, without limitation, multiple encoded training videos and the associated training videos. A bootstrapping training engine included in the training subsystem generates a baseline dataset based on the feature matrix and a subjective matrix that represents raw opinion scores from multiple human subjects associated with the encoded training videos. The bootstrapping training engine performs any number of resampling with replication operations on the feature matrix and/or the subjective matrix to generate any number of resampled datasets. The bootstrapping training engine performs machine learning operations based on the baseline dataset to generate a baseline model that predicts a perceptual quality score for an encoded source video. For each of the resampled datasets, the bootstrapping training engine performs machine learning operations based on the resampled dataset to generate a different bootstrap model that predicts a perceptual quality score for an encoded source video. The encoded source video may be any portion of video content, including an image.

Subsequently, a confidence application generates a baseline perceptual quality score for an encoded source video based on the baseline model, the encoded source video, and the associated source video. In a complementary fashion, for each of the bootstrap models, the confidence application generates a different bootstrap perceptual quality score based on the bootstrap model, the encoded source video, and the associated source video. The confidence application then generates a score distribution that includes, without limitation, the bootstrap perceptual quality scores. Subsequently, the confidence application computes a confidence interval based on the score distribution and a confidence level. Each of the distribution and the confidence interval quantifies the accuracy of the baseline perceptual quality score.

In some embodiments, a BD-rate significance application quantifies accuracy for BD-rate values based on the baseline model and the bootstrap models. For each of any number of source images, a BD-rate subsystem generates a BD-rate dataset based on a test codec, a reference codec, any number of bitrate settings, the baseline model, and the bootstrap models. The BD-rate dataset for a given source includes a baseline BD-rate value and multiple bootstrap BD-rate values. Notably, the BD-rate subsystem generates the baseline BD-rate value based on baseline scores generated by the baseline model and generates each of the bootstrap BD-rate values based on bootstrap scores generated by a different bootstrap model.

Subsequently, an aggregation engine performs any number and type of aggregation operations across the baseline BD-rate values of the different sources to generate a codec baseline BD-rate associated with the test codec. Similarly, for each of the bootstrap models, the aggregation engine performs any number and type of aggregation operations across the associated bootstrap BD-rate values of the different sources to generate a different codec bootstrap BD-rate associated with the test codec. The confidence application then generates a codec BD-rate distribution that includes, without limitation, the codec bootstrap BD-rate values. Subsequently, the confidence application computes a codec BD-rate confidence interval based on the codec BD-rate distribution and a confidence level. Each of the codec BD-rate distribution and the codec BD-rate confidence interval quantifies the accuracy of the codec baseline BD-rate associated with the test codec.

Advantageously, the different bootstrap scores reflect the uncertainty associated with performing machine learning operations based on a finite set of encoded training videos and/or a finite set of human subjects. Consequently, the distribution of the bootstrap scores and the associated confidence interval reliably predict the accuracy of the baseline score. Understanding the accuracy of the baseline score allows developers and software applications to draw more valid conclusions and/or more reliably optimize encoding operations based on the baseline score. In particular, by quantifying the accuracy of the codec baseline BD-rate based on bootstrap scores, the BD-rate significance application enables developers and software applications to reliably assess whether the codec baseline BD-rate is statistically significant. These technical advantages provide one or more technological advancements over the prior art.

1. In some embodiments, a computer-implemented method comprises performing one or more sampling operations on a training database that includes subjective scores to generate a plurality of resampled datasets; for each resampled dataset, performing one or more machine learning operations based on the resampled dataset to generate a different bootstrap perceptual quality model; and performing one or more operations based on the bootstrap perceptual models to quantify the accuracy of a perceptual quality score generated by a baseline perceptual quality model for a portion of encoded video content.

2. The computer-implemented method of clause 1, further comprising performing one or more machine learning operations based on the training database to generate the baseline perceptual quality model.

3. The computer-implemented method of clauses 1 or 2, wherein each of the perceptual quality model and the bootstrap perceptual quality models maps a set of feature values for a set of features that characterize encoded video content to a different perceptual quality score.

4. The computer-implemented method of any of clauses 1-3, wherein the set of features includes at least one of an additive impairment measure (ADM) feature, a visual information fidelity (VIF) feature, a blind/referenceless image spatial quality evaluator (BRISQUE) feature, and a temporal information (TI) feature.

5. The computer-implemented method of any of clauses 1-4, wherein performing the one or more sampling operations comprises performing one or more resampling with replacement operations on feature values associated with portions of training encoded video content included in the training database.

6. The computer-implemented method of any of clauses 1-5, wherein performing the one or more sampling operations comprises performing one or more resampling with replacement operations on the subjective scores to generate a plurality of resampled subjective matrices.

7. The computer-implemented method of any of clauses 1-6, wherein performing the one or more sampling operations comprises performing one or more resampling with replacement operations on feature values associated with portions of encoded content included in the training database to generate a plurality of resampled feature matrices; and performing one or more resampling with replacement operations on the subjective scores to generate a plurality of resampled subjective matrices.

8. The computer-implemented method of any of clauses 1-7, further comprising combining each resampled feature matrix included in the plurality of resampled feature matrices with each resampled subjective matrix included in the plurality of resampled subjective matrices to generate the plurality of resampled datasets.

9. The computer-implemented method of any of clauses 1-8, wherein performing the or more operations based on the bootstrap perceptual models comprises, for each bootstrap perceptual model, generating a different bootstrap perceptual quality score based on the portion of encoded video content, wherein the distribution of the bootstrap perceptual quality scores quantifies the accuracy of the perceptual quality score.

10. The computer-implemented method of any of clauses 1-9, wherein performing the or more operations based on the bootstrap perceptual models comprises for each bootstrap perceptual model, generating a different bootstrap perceptual quality score based on the portion of encoded video content; and computing a confidence interval based on the bootstrap perceptual quality scores and a confidence level.

11. In some embodiments, one or more non-transitory computer readable media include instructions that, when executed by one or more processors, cause the one or more processors to perform the steps of performing one or more sampling operations on a training database that includes subjective scores to generate a plurality of resampled datasets; for each resampled dataset, performing one or more machine learning operations based on the resampled dataset to generate a different bootstrap perceptual quality model; and computing a plurality of bootstrap perceptual quality scores based on the bootstrap perceptual models and a portion of encoded video content to quantify the accuracy of a perceptual quality score generated by a baseline perceptual quality model for the portion of encoded video content.

12. The one or more non-transitory computer readable media of clause 11, wherein a first subjective score included in the subjective scores is assigned by a human in response to viewing a reconstructed version of a portion of encoded video content included in the training database.

13. The one or more non-transitory computer readable media of clauses 11 or 12, wherein the perceptual quality score is a value for a Video Multimethod Assessment Fusion (VMAF) metric.

14. The one or more non-transitory computer readable media of any of clauses 11-13, wherein performing the one or more sampling operations comprises performing one or more resampling with replacement operations on feature values associated with portions of training encoded video content included in the training database.

15. The one or more non-transitory computer readable media of any of clauses 11-14, wherein performing the one or more sampling operations comprises performing one or more resampling with replacement operations on the subjective scores to generate a plurality of resampled subjective matrices.

16. The one or more non-transitory computer readable media of any of clauses 11-15, further comprising performing one or more aggregation operations on each resampled subjective matrix included in the plurality of resampled subjective matrices to to generate a plurality of subjective vectors.

17. The one or more non-transitory computer readable media of any of clauses 11-16, wherein performing the one or more sampling operations comprises performing one or more resampling with replacement operations on feature values associated with portions of encoded content included in the training database to generate a plurality of resampled feature matrices; and performing one or more resampling with replacement operations on the subjective scores to generate a plurality of resampled subjective matrices.

18. The one or more non-transitory computer readable media of any of clauses 11-17, further comprising combining each resampled feature matrix included in the plurality of resampled feature matrices with each resampled subjective matrix included in the plurality of resampled subjective matrices to generate the plurality of resampled datasets.

19. The one or more non-transitory computer readable media of any of clauses 11-18, further comprising computing a confidence interval based on the plurality of bootstrap perceptual quality scores and a confidence level.

20. In some embodiments, a system comprises one or more memories storing instructions; and one or more processors that are coupled to the one or more memories and, when executing the instructions, are configured to perform one or more resampling with replacement operations on a training database that includes subjective scores and feature values to generate a plurality of resampled datasets; for each resampled dataset, perform one or more machine learning operations based on the resampled dataset to generate a different bootstrap perceptual quality model; and perform one or more operations based on the bootstrap perceptual models to quantify the accuracy of a perceptual quality score generated by a baseline perceptual quality model for a portion of encoded video content.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
performing one or more sampling operations on a training database that includes subjective scores to generate a plurality of resampled datasets;
for each resampled dataset, performing one or more machine learning operations based on the resampled dataset to generate a different bootstrap perceptual quality model;
generating a plurality of perceptual quality scores for a portion of encoded video content using the different bootstrap perceptual quality models; and
performing one or more operations based on the bootstrap perceptual quality models to generate a first confidence interval from a subset of the plurality of perceptual quality scores that meets a first threshold criterion, wherein the first confidence interval quantifies an quantify the accuracy of a perceptual quality score generated by a baseline perceptual quality model for the portion of encoded video content, wherein the baseline perceptual quality model does not comprise one of the bootstrap perceptual quality models, and wherein the portion of encoded video content is not included in the training database.

2. The computer-implemented method of claim 1, further comprising performing one or more machine learning operations based on the training database to generate the baseline perceptual quality model.

3. The computer-implemented method of claim 1, wherein each of the baseline perceptual quality model and the bootstrap perceptual quality models maps a set of feature values for a set of features that characterize encoded video content to a different perceptual quality score.

4. The computer-implemented method of claim 3, wherein the set of features includes at least one of an additive impairment measure (ADM) feature, a visual information fidelity (VIF) feature, a blind/referenceless image spatial quality evaluator (BRISQUE) feature, and a temporal information (TI) feature.

5. The computer-implemented method of claim 1, wherein performing the one or more sampling operations comprises performing one or more resampling with replacement operations on feature values associated with portions of training encoded video content included in the training database.

6. The computer-implemented method of claim 1, wherein the training database includes individual subjective scores provided by a plurality of subjective reviewers for a plurality of encoded videos, and wherein performing the one or more sampling operations comprises performing one or more resampling with replacement operations on the plurality of subjective reviewers to generate a plurality of resampled subjective matrices that each includes the individual subjective scores associated with a resampled subset of the plurality of subjective reviewers for at least one encoded video.

7. The computer-implemented method of claim 1, wherein performing the one or more sampling operations comprises:
performing one or more resampling with replacement operations on feature values associated with portions of encoded content included in the training database to generate a plurality of resampled feature matrices; and
performing one or more resampling with replacement operations on the subjective scores to generate a plurality of resampled subjective matrices.

8. The computer-implemented method of claim 7, further comprising combining each resampled feature matrix included in the plurality of resampled feature matrices with each resampled subjective matrix included in the plurality of resampled subjective matrices to generate the plurality of resampled datasets.

9. A system, comprising:
one or more memories storing instructions; and
one or more processors that are coupled to the one or more memories and, when executing the instructions, are configured to:
perform one or more resampling with replacement operations on a training database that includes subjective scores and feature values to generate a plurality of resampled datasets;
for each resampled dataset, perform one or more machine learning operations based on the resampled dataset to generate a different bootstrap perceptual quality model;
generate a plurality of perceptual quality scores for a portion of encoded video content using the different bootstrap perceptual quality models; and perform one or more operations based on the bootstrap perceptual quality models to generate a first confidence interval from a subset of the plurality of perceptual quality scores that meets a first threshold criterion, wherein the first confidence interval quantifies an quantify the accuracy of a perceptual quality score generated by a baseline perceptual quality model for a portion of encoded video content, wherein the baseline perceptual quality model does not comprise one of the bootstrap perceptual quality models, and wherein the portion of encoded video content is not included in the training database.

* * * * *

UNITED STATES PATENT AND TRADEMARK OFFICE
CERTIFICATE OF CORRECTION

| | |
|---|---|
| PATENT NO. | : 12,075,104 B2 |
| APPLICATION NO. | : 16/352755 |
| DATED | : August 27, 2024 |
| INVENTOR(S) | : Christos Bampis et al. |

It is certified that error appears in the above-identified patent and that said Letters Patent is hereby corrected as shown below:

In the Claims

Column 31, Claim 1, Lines 63-64, please delete "quantify the";

Column 33, Claim 9, Line 6, please delete "quantify the".

Signed and Sealed this
Fifteenth Day of October, 2024

Katherine Kelly Vidal
*Director of the United States Patent and Trademark Office*